US011995561B2

(12) United States Patent
Kaplan

(10) Patent No.: US 11,995,561 B2
(45) Date of Patent: May 28, 2024

(54) UNIVERSAL CLIENT API FOR AI SERVICES

(71) Applicant: MeetKai, Inc., Marina Del Rey, CA (US)

(72) Inventor: James Kaplan, Marina Del Rey, CA (US)

(73) Assignee: MeetKai, Inc., Marina Del Rey, CA (US)

( * ) Notice: Subject to any disclaimer, the term of this patent is extended or adjusted under 35 U.S.C. 154(b) by 0 days.

(21) Appl. No.: 17/218,021

(22) Filed: Mar. 30, 2021

(65) Prior Publication Data

US 2021/0304020 A1 Sep. 30, 2021

Related U.S. Application Data

(63) Continuation-in-part of application No. 17/204,724, filed on Mar. 17, 2021.

(Continued)

(51) Int. Cl.
  *G06F 15/16* (2006.01)
  *G06F 9/54* (2006.01)
  *G06N 5/02* (2023.01)

(52) U.S. Cl.
  CPC .............. *G06N 5/02* (2013.01); *G06F 9/541* (2013.01); *G06F 9/547* (2013.01)

(58) Field of Classification Search
  CPC ........... G06N 5/02; G06F 9/541; G06F 9/547; G06F 2209/503; G06F 2209/509;
  (Continued)

(56) References Cited

U.S. PATENT DOCUMENTS 7,831,564 B1 *   11/2010   Wei ..................... G06F 11/1458
                                                            707/649
8,700,608 B2 *   4/2014    Belknap ............ G06F 16/24542
                                                            707/715
(Continued)

FOREIGN PATENT DOCUMENTS

CN         110728363        1/2020
KR      10-2002-0030545     4/2002
(Continued)

OTHER PUBLICATIONS

International Search Report dated Jul. 1, 2021 in corresponding PCT/US2021/021767.

(Continued)

*Primary Examiner* — Thuong Nguyen
(74) *Attorney, Agent, or Firm* — Weide & Miller, Ltd.

(57) ABSTRACT

A method and system to provide artificial intelligence services to user interacting applications which includes receiving first unfulfilled service request from a user interaction application executing on a user device and generating, from the unfulfilled service request, an unfulfilled artificial intelligence service request and an unfulfilled non-artificial intelligence service request. The unfulfilled artificial intelligence service request is transmitted to an artificial intelligence service module to fulfill the unfulfilled artificial intelligence service request, which generates a fulfilled artificial intelligence service request. The unfulfilled non-artificial intelligence service request is transmitted to a back-end server to fulfill the unfulfilled non-artificial intelligence service request, which generates a fulfilled non-artificial intelligence service request. An artificial intelligence proxy is used to combine the fulfilled artificial intelligence service request and the fulfilled non-artificial intelligence service request into a first fulfilled service request, which the artificial (Continued)

intelligence proxy then transmits to the user interacting application.

16 Claims, 28 Drawing Sheets

Related U.S. Application Data

(60) Provisional application No. 63/002,254, filed on Mar. 30, 2020, provisional application No. 62/991,038, filed on Mar. 17, 2020.

(58) Field of Classification Search
CPC ... G06F 9/5055; H04L 67/10; H04L 67/2833; H04L 67/02
USPC ........... 709/11, 201; 370/252, 253; 707/649, 707/640, 200, 10
See application file for complete search history.

(56) References Cited

U.S. PATENT DOCUMENTS

| | | | | |
|---|---|---|---|---|
| 8,952,970 | B2* | 2/2015 | Song | G06F 9/451 |
| | | | | 345/505 |
| 8,981,962 | B2 | 3/2015 | Fu | |
| 9,267,518 | B2 | 2/2016 | Chang | |
| 9,607,102 | B2 | 3/2017 | Lavallee et al. | |
| 9,654,598 | B1 | 5/2017 | Crawford et al. | |
| 9,721,570 | B1 | 8/2017 | Beal et al. | |
| 10,156,775 | B2 | 12/2018 | Zimmermann | |
| 10,402,460 | B1 | 9/2019 | Jesensky et al. | |
| 10,402,589 | B1 | 9/2019 | Madisetti et al. | |
| 11,042,369 | B1 | 6/2021 | Kimball | |
| 2002/0032591 | A1 | 3/2002 | Mahaffy | |
| 2002/0080726 | A1* | 6/2002 | Klassen | H04L 43/50 |
| | | | | 370/252 |
| 2005/0124906 | A1 | 6/2005 | Childre et al. | |
| 2007/0043736 | A1* | 2/2007 | Jain | G06F 16/951 |
| 2007/0064276 | A1* | 3/2007 | Park | H04N 1/0096 |
| | | | | 358/448 |
| 2009/0106321 | A1* | 4/2009 | Das | G06F 16/24542 |
| 2010/0205222 | A1* | 8/2010 | Gajdos | G06F 16/683 |
| | | | | 707/E17.014 |
| 2011/0246496 | A1 | 10/2011 | Sung | |
| 2012/0317108 | A1* | 12/2012 | Okazaki | G06F 3/04815 |
| | | | | 704/235 |
| 2014/0167760 | A1* | 6/2014 | Koh | G01R 33/3692 |
| | | | | 324/322 |
| 2014/0244712 | A1 | 8/2014 | Walters | |
| 2015/0051502 | A1 | 2/2015 | Ross | |
| 2015/0106737 | A1 | 4/2015 | Montoy-Wilson et al. | |
| 2015/0199010 | A1 | 7/2015 | Coleman et al. | |
| 2015/0288857 | A1 | 10/2015 | Fay et al. | |
| 2015/0351655 | A1 | 12/2015 | Coleman | |
| 2016/0205188 | A1* | 7/2016 | Doraiswamy | H04L 67/1097 |
| | | | | 709/205 |
| 2017/0039291 | A1 | 2/2017 | Singh et al. | |
| 2017/0046124 | A1* | 2/2017 | Nostrant | G10L 21/00 |
| 2017/0092270 | A1 | 3/2017 | Newendorp et al. | |
| 2017/0206797 | A1* | 7/2017 | Solomon | G06N 3/006 |
| 2017/0333666 | A1 | 11/2017 | Goldberg et al. | |
| 2017/0357637 | A1 | 12/2017 | Nell et al. | |
| 2017/0357910 | A1 | 12/2017 | Sommer et al. | |
| 2018/0011903 | A1 | 1/2018 | Abolhassani et al. | |
| 2018/0027126 | A1* | 1/2018 | Stricker | H04L 63/04 |
| | | | | 370/328 |
| 2018/0054228 | A1 | 2/2018 | Lin | |
| 2018/0075145 | A1 | 3/2018 | Zhao et al. | |
| 2018/0089410 | A1* | 3/2018 | Caso | H04W 12/068 |
| 2018/0096678 | A1 | 4/2018 | Zhou et al. | |
| 2018/0159889 | A1 | 6/2018 | Sjouwerman | |
| 2018/0181608 | A1* | 6/2018 | Wu | G06F 16/2423 |
| 2018/0213037 | A1 | 7/2018 | Roman | |
| 2018/0232920 | A1 | 8/2018 | Faulkner et al. | |
| 2018/0262391 | A1 | 9/2018 | Jung | |
| 2018/0300679 | A1 | 10/2018 | Mahmood | |
| 2018/0315499 | A1 | 11/2018 | Appelbaum | |
| 2018/0337875 | A1 | 11/2018 | Friio | |
| 2018/0374474 | A1* | 12/2018 | Wang | G10L 15/1815 |
| 2019/0035396 | A1 | 1/2019 | Adamski | |
| 2019/0042955 | A1 | 2/2019 | Cahill et al. | |
| 2019/0083034 | A1 | 3/2019 | Shim et al. | |
| 2019/0122121 | A1 | 4/2019 | Yu | |
| 2019/0155566 | A1 | 5/2019 | Dory | |
| 2019/0215673 | A1* | 7/2019 | Choi | H04L 47/20 |
| 2019/0269376 | A1* | 9/2019 | Butani | A61B 6/025 |
| 2019/0354599 | A1* | 11/2019 | Mital | G06N 20/00 |
| 2019/0385606 | A1 | 12/2019 | Won | |
| 2020/0042286 | A1* | 2/2020 | Bui | G06F 3/0484 |
| 2020/0092519 | A1 | 3/2020 | Shin et al. | |
| 2020/0242146 | A1 | 7/2020 | Kalukin | |
| 2020/0327431 | A1 | 10/2020 | Woo | |
| 2020/0335102 | A1* | 10/2020 | Lefkofsky | G10L 15/22 |
| 2020/0342968 | A1* | 10/2020 | Avinash | G06F 9/451 |
| 2020/0402502 | A1 | 12/2020 | Hanes | |
| 2021/0011887 | A1* | 1/2021 | Visser | G06F 40/30 |
| 2021/0049827 | A1 | 2/2021 | Lebaredian | |
| 2021/0056753 | A1* | 2/2021 | Yasar | G06V 20/64 |
| 2021/0297494 | A1* | 9/2021 | Kaplan | G06F 9/4881 |
| 2021/0304020 | A1* | 9/2021 | Kaplan | G06F 9/541 |
| 2021/0366473 | A1 | 11/2021 | Maeng | |

FOREIGN PATENT DOCUMENTS

| | | |
|---|---|---|
| KR | 10-20100035391 | 8/2010 |
| KR | 10-2018-0050771 | 5/2018 |
| KR | 10-20160178837 | 5/2018 |
| KR | 10-2018-0096183 | 8/2018 |
| KR | 10-2019-0080834 | 7/2019 |
| KR | 1020190094307 | 8/2019 |
| KR | 20190106269 | 9/2019 |
| WO | WO 2019/172946 | 9/2019 |
| WO | WO 2019/183062 | 9/2019 |

OTHER PUBLICATIONS

International Search Report dated Jul. 9, 2021 in corresponding PCT/US2021/022827.
International Search Report dated Jul. 9, 2021 in corresponding PCT/US2021/024515.
International Search Report dated Jul. 19, 2021 in corresponding PCT/US2021/024720.
International Search Report dated Jul. 20, 2021 in corresponding PCT/US2021/024994.
International Search Report dated Aug. 9, 2021 in corresponding PCT/US2021/029472.
International Search Report dated Oct. 13, 2021 in corresponding PCT/US2021/038266.
International Search Report dated Jan. 20, 2022 in corresponding PCT/US2021/053646.

* cited by examiner

UNIVERSAL CLIENT API FOR AI SERVICES

1. FIELD OF THE INVENTION

The invention relates to virtual assistants and in particular a method and apparatus for artificial intelligence layer across multiple platforms.

2. BACKGROUND

Current systems for cross platform AI (artificial intelligence) are typically based in either one of three methodologies. The first is to develop a cross platform "runtime" where a user can develop an AI model in their platform of choice (PC, Cloud) and then deploy it to a runtime that has native implementations on a set number of platforms. Deployment refers to the process of making a software (such as an AI model) or operating system available for use. The runtime then only executes the model locally. The drawbacks of this approach are numerous. First, it is not possible for the application or model developer to extend the runtime environment. Second, application developers on the same operating system cannot share the same runtime resources as each model deployed to the runtime must duplicate all of its data and parameters for execution. Third, the model compiler has no concept of the specifics of the hardware so optimization for the runtime on a specific platform becomes impossible. Further, there is no ability to partition the execution such that some of the model runs in a cloud environment, instead everything must run within the confines of the runtime in a very static way.

The second approach is for an SDK (software development kit) to be included in an application developer's binary such that they are able to make use of AI capabilities installed in the SDK. The SDK provides all services locally on the device it is installed on. A downside of this methodology is that the SDK is very static and there is no ability for model developers to extend the platform. Likewise, because the SDK runs entirely on the device, device-cloud hybrid procedures are impossible. In this way even though some of the shortcomings of the first method are solved many new ones are introduced.

The final method is through a cloud-based API. In these systems, the application developer bundles a small SDK with their application where all of the intelligent service requests are proxied to a cloud execution environment. In this system, only pre- and post-processing is run on the device and the primary AI computation is carried out in the cloud server. This methodology makes no use of the hardware capabilities of the device and introduces massive network overhead, which slows operation. Likewise, it involves the orchestration of cloud services outside of the device's management sphere.

SUMMARY

To overcome the drawbacks of the prior art and provide additional benefits, the innovation relates to enabling development of artificial intelligence ("AI") services across multiple platforms where the capabilities can be partitioned to compute on both the deployment device, local devices in the same network, or a hybrid combination of cloud and local services. In doing so, it becomes possible for an application developer to execute high level AI primitives without having to consider the execution capabilities of the device or cloud availability. An example of a high-level primitive is passing an image to the virtual assistant and classifying the image.

This innovation improves over the three prior art methodologies above by instead deploying a layer on top of the operating system rather than providing an SDK to individual developers. This layer allows for AI procedures to be executed by an application developer with transparent hardware and network optimizations made by the layer. Additionally, the AI layer can have new functionality deployed by an individual developer such that other users or applications on the OS running on top of the layer can also make use of this new functionality. The AI layer is capable of running on top of both mobile operating systems, consumer desktop operating systems, cloud server operating systems, or on embedded operating systems. The term 'layer' refers to a dynamic library. The system and processing may be distributed, and capabilities are local, on another device, in the cloud, or in any combination. The term system is defined to mean software, hardware, or both which enable and provide the functionality described herein. The layer determines if a request can be run locally or should be requested from a library running on another device or in the cloud. The layer methodology provides the following capabilities for scheduling a computation:

- Only a single layer needs to be installed over the entire operating. Once installed, applications and system services can route all requests through the same layer
- The layer can monitor the operating system resources to determine if execution of a requested intelligent service can be carried out locally
- The layer can monitor resources available to other connected layers running on devices on the same network as the operating system in a cloud computing environment. Computation not possible on the current layer can be passed off to those layers or other locations.
- The layer can monitor resources available in layers deployed in cloud environments. The layer is capable of determining the tradeoff between network latency and compute contention on the device in order to pass off requests to cloud layers.

This innovation also provides mechanisms with which a developer can deploy new AI services or update and build on top of prebuilt services. Prebuilt services are well defined AI models with specific use-cases. A prebuilt service could be natural language processing for a specific domain such as e-commerce and sales. This may be carried out through the following capabilities:

- A developer can upload their dataset to the cloud layer for training to take place. A dataset could consist of a developer's product inventory, language dataset, or any set of information that will be used to train the model. The next time the service is triggered, the cloud layer can provide the updated execution.
- A user on a device can make changes to their local layer. When the layer next passes off computation to the cloud layer the cloud layer, can receive the updated model.
- Local layer refers to the software library running on the immediate device.
- Cloud layer refers to the aiOS functions hosted on servers across the internet. The local layer determines when to call the cloud layer.
- Disclosed herein is a method of receiving first unfulfilled service request from a user interaction application executing on a user device and generating, from the unfulfilled service request, an unfulfilled artificial intelligence service request and an unfulfilled non-artificial intelligence service request. A non-artificial intelligence service request is a request that can be responded to without using AI, such as for example performing database lookups or queries. The unfulfilled artificial intelligence service request is transmitted to an artificial intelligence service module to fulfill the unfulfilled artificial intelligence service request, which generates a fulfilled artificial intelligence service request. The unfulfilled non-artificial intelligence service request is transmitted to a back-end server to fulfill the unfulfilled non-artificial intelligence service request, which generates a fulfilled non-artificial intelligence service request. An artificial intelligence proxy is used to combine the fulfilled artificial intelligence service request and the fulfilled non-artificial intelligence service request into a first fulfilled service request, which the artificial intelligence proxy then transmits to the user interacting application. The user interacting application may then present the first fulfilled service request to the user as an audio or visual response on the user device on which the user interaction application is executing.

In one embodiment, the artificial intelligence service module may be part of the back-end server. It is contemplated that the unfulfilled artificial intelligence service request is selected from, but is not limited to, the following exemplary service requests types: image modelling, text modelling, forecasting, planning, making recommendations, performing searches, processing speech into service requests, processing audio into service requests, processing video into service requests, processing image into service requests, facial recognition, motion detection, motion tracking, generating audio, generating text, generating image, or generating video.

The disclosed method may also include the additional steps of receiving a second unfulfilled service request from the user interaction application, generating a third unfulfilled service request, and processing the second unfulfilled service request and the third unfulfilled service request using the artificial intelligence module, the back-end server, or both to generate a second fulfilled service request. It is contemplated that the second fulfilled service request is capable of fulfilling the second service request and the third service request. The second fulfilled service request is then transmitted to the user interaction application, where the second fulfilled service request is presented to the user as an audio or visual response on the user device on which the user interaction application is executing. In one embodiment, transmission of the unfulfilled artificial intelligence service request to an artificial intelligence service module is performed by an intelligent SDK imbedded by the user interaction application.

Also disclosed is a system providing artificial intelligence services to user interaction applications. The system includes a user device. The user device includes a memory which stores non-transitory machine executable code and a processor configured to execute the machine executable code. The system also includes a user interface configured to receive a first input from a user and provide output to the user. The machine executable code includes a user interaction application with an intelligent SDK. The intelligent SDK is configured to generate a first unfulfilled service request from the first input. From the first unfulfilled service request, the intelligent SDK is configured to generate an unfulfilled artificial intelligence service request and an unfulfilled non-artificial intelligence service request. The unfulfilled artificial intelligence service request is transmitted to an artificial intelligence service module to fulfill the unfulfilled artificial intelligence service request, which generates a fulfilled artificial intelligence service request. The unfulfilled non-artificial intelligence service request is transmitted to a back-end server to fulfill the unfulfilled non-artificial intelligence service request, which generates a fulfilled non-artificial intelligence service request. The fulfilled artificial intelligence service request and the fulfilled non-artificial intelligence service request are combined into a first fulfilled service request responsive to the first unfulfilled service request and transmitted back to the user interaction application to generate a first response which is output to the user via the user interface of the user device.

In one embodiment, the intelligent SDK is separate from the user interaction application. It is contemplated that the intelligent SDK may also include an artificial intelligence proxy. The artificial intelligence proxy may be configured to facilitate the transmission of the unfulfilled artificial intelligence service request, the fulfilled artificial intelligence service request, the unfulfilled non-artificial intelligence service request, and the fulfilled non-artificial intelligence service request to back-end servers and artificial intelligence service modules. The unfulfilled artificial intelligence service request may be one or more of the following service requests types: image modelling, text modelling, forecasting, planning, making recommendations, performing searches, processing speech into service requests, processing audio into service requests, processing video into service requests, processing image into service requests, facial recognition, motion detection, motion tracking, generating audio, generating text, generating image, or generating video.

In one embodiment of the system, the user interface is configured to receive a second input from the user and output a second response to the user, and the machine executable code, responsive to the second input from the user, is further configured to generate a second unfulfilled service request based on the second input, generate a third unfulfilled service request based on the second input, and process the second unfulfilled service request and the third unfulfilled service request using an artificial intelligence module, a back-end server, or both, to generate a second fulfilled service request. The second fulfilled service request may be capable of fulfilling the second service request and the third service request. The machine executable code may be further configured to transmit the second fulfilled service request to the user interaction application to generate the second response and to provide the second response to the user.

Another embodiment of the system disclosed for artificial intelligence services to user interaction applications includes a user interaction application configured as machine executable code stored in non-transitory form on a memory. The user interaction application includes a user interface and an intelligent SDK. The user interface is configured to receive input from a user and provide an output to the user. The intelligent SDK is configured to generate, from the first input, a first unfulfilled non-artificial intelligence service request and a first unfulfilled artificial intelligence service request. The first unfulfilled non-artificial intelligence service request is transmitted to a back-end server to fulfill the first unfulfilled non-artificial intelligence service request and to generate a first fulfilled non-artificial intelligence service request. The first unfulfilled artificial intelligence service request is transmitted to an artificial intelligence service module to fulfill the first unfulfilled artificial intelligence service request and to generate a first fulfilled artificial intelligence service request. The output to the user is generated from the first fulfilled non-artificial intelligence service request, and the first fulfilled artificial intelligence service request. The output is responsive to the input.

In one embodiment, the disclosed system also includes an artificial intelligence proxy, which is configured to facilitate the transmission of the unfulfilled artificial intelligence service request, the fulfilled artificial intelligence service request, the unfulfilled non-artificial intelligence service request, and the fulfilled non-artificial intelligence service request to one or more back-end servers and one or more artificial intelligence service modules.

It is contemplated the unfulfilled artificial intelligence service request is selected from the following service requests types: image modelling, text modelling, forecasting, planning, making recommendations, performing searches, processing speech into service requests, processing audio into service requests, processing video into service requests, processing image into service requests, facial recognition, motion detection, motion tracking, generating audio, generating text, generating image, or generating video.

In one embodiment, the user interface is also configured to receive a second input from the user and to provide a second output to the user. The intelligent SDK, responsive to the second input from the user, is further configured to generate a second unfulfilled artificial intelligence service request based on the first input and the second input and process the second unfulfilled artificial intelligence service request using an artificial intelligence module to generate a second fulfilled artificial intelligence service request. The second fulfilled artificial intelligence service request is capable of fulfilling the first unfulfilled artificial intelligence service request and the second unfulfilled artificial intelligence service request. The second output is generated from the second output from the second fulfilled artificial intelligence service request. The second output is responsive to the first input and the second input.

It is also contemplated that the user interface may be configured to receive a third input from the user and to provide a third output to the user. The intelligent SDK, responsive to the third input from the user, is further configured to determine whether to generate a third unfulfilled artificial intelligence service request based on one of the following: (1) the first input, the second input, and the third input, (2) the second input, and the third input, or (3) the third input. In one embodiment, the back-end server includes the artificial intelligence module.

DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Glossary of Terms

Figure 1:
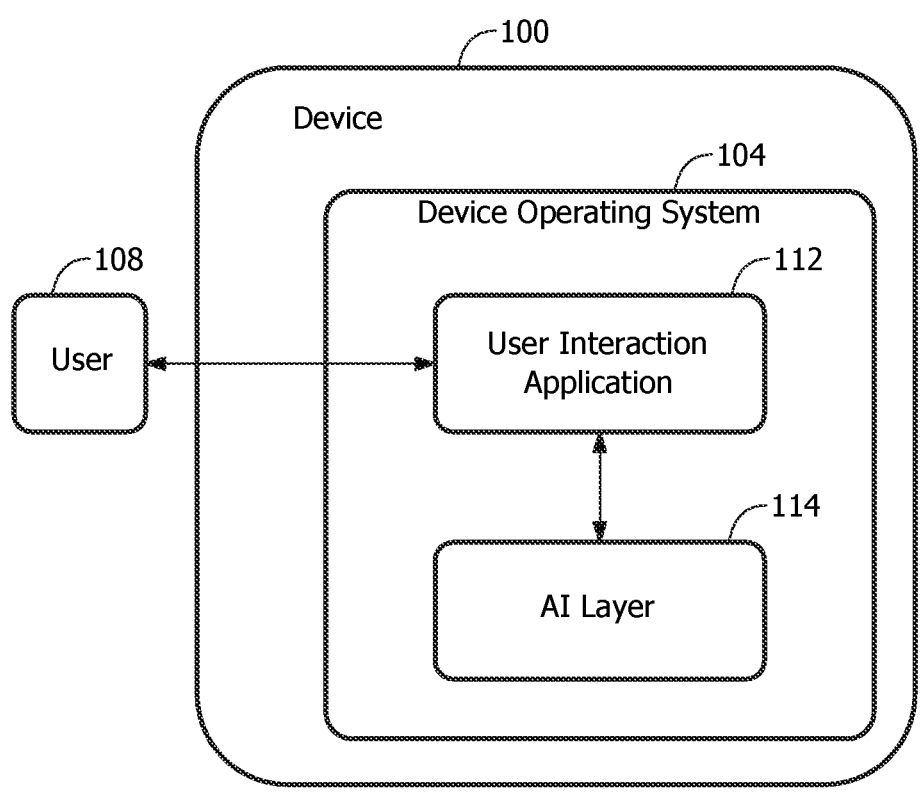
FIG. 1 illustrates a standalone AI layer running on a single user device. This configuration overcomes the aforementioned limitations.

AI services: AI services are services provided as procedures and methods to a program to accomplish artificial intelligence goals. Examples may include image modelling, text modelling, forecasting, planning, recommendations, search, speech processing, audio processing, audio generation, text generation, image generation, and many more.

Device: A device is any element running with a minimum of a network controller and a CPU. Optionally, an accelerator can be attached in the form of a GPU or other specialized hardware accelerator. This accelerator can speed up the computation of AI services.

Operating System ("OS"): An operating system is software that supports a computer's basic functions, such as scheduling tasks, executing applications, and controlling hardware. The operating system provides access to these functions to other software.

Application ("App"): An app is any software running on any user facing device such as mobile devices, smart watches, tablets, home speakers, wearable devices including smart rings, glasses, hearing aids, CarPlay devices, security cameras, webcams, televisions, projection screen monitors, sound bars, personal computers, headphones, earbuds, and laptop devices where a user can interact with touch, audio, visual, or passively.

Fine tuning/training: an AI service can be "tuned" on a dataset to provide specialized and enhanced capabilities for the specific use case. A model is "trained" with a standard set of data, for instance audio files for word detection. Fine tuning would allow a final step of training for a specific task. For example, a stage where the user speaks defined words, and the model is trained on that user's voice and accent.

As disclosed herein, the innovation introduces a new and improved method and apparatus for providing AI services across multiple platforms. This improved method uses a dynamic AI layer or AI operating system ("aiOS") to facilitate compatibility between any user interaction application and any platform the AI services is deployed on. A user interaction application may comprise any application software executable on the device that the user may interact with, such as but not limited, to a virtual assistant, music player, search engine, weather app, game, audio recorder, or calendar.

For example, a user interaction application may be a weather app that only permits text-based user-input (such as entering a location by text). If the developer of that weather app wishes to add an AI feature, such as speech recognition (allowing the user to enter a location by voice command), using conventional methods the developer would not be able to deploy the feature across multiple platforms. There may be hardware limitations because some devices, such as a smartwatch, may not have built-in speech-recognition capabilities. In that case, the developer would not be able to implement the speech-recognition feature on a weather app installed on certain devices, or different devices, such as phones and computers, as these devices utilize different hardware to accomplish speech-recognition. In that case, the developer may need to provide numerous different versions of the software app to ensure compatibility with each type of hardware.

In addition, there may be software limitations because different platforms, such as Android OS and iOS, require different coding languages. In that case, the developer may need to implement different versions of the speech-recognition feature compatible with the different languages. There may also be network limitations because some devices may have access to the internet while others do not. As an example, speech recognition in a weather app installed in a vehicle may only be able to utilize a local database provided by weather app itself, because the vehicle may not have Wi-Fi connection. On the other hand, speech recognition in a weather app installed on a smartphone may utilize cloud-based databases because the smartphone has Wi-Fi access. In that case, the developer may, once again, need to implement different versions of the speech-recognition feature depending on what device the weather app operates on.

On the other hand, using the method and apparatus disclosed herein, the developer could deploy a single version of the updated weather app on any device using any operating system because the AI layer or the aiOS can overcome the hardware, software, or network differences to enable operation.

FIG. 1 illustrates a standalone AI layer running on a single user device. This configuration overcomes the aforementioned limitations.

In FIG. 1, a device 100 (such as a smartphone, tablet, or any other device) includes an operating system 104 (such as iOS, or Android). Installed in the device operating system 104 is a user interaction application 112. The user interaction application 112 may comprise any application software executable on the device that the user may interact with, such as but not limited to, a virtual assistant, music player, search engine, weather app, game, audio recorder, or calendar. Also installed in the device operating system 104 is an AI layer 114. The AI layer 114 is accessible to all applications installed in the device operating system 104, including the user interaction application 112.

Using the example discussed above, the user interaction application 112 may be a weather app that, in its original form, does not have speech recognition features. Thus, a user 108 may provide input comprising an audio input which the weather app may recognize as a service request that the weather app cannot fulfill. Thus, the weather app passes the service request to the AI layer 114, which then uses the speech recognition feature provided by the AI layer's 114 to fulfill the service request. In one embodiment, the AI layer 114 may first attempt to utilize the speech recognition feature provided on the device operating system's 104 to fulfill the service request.

Figure 2:
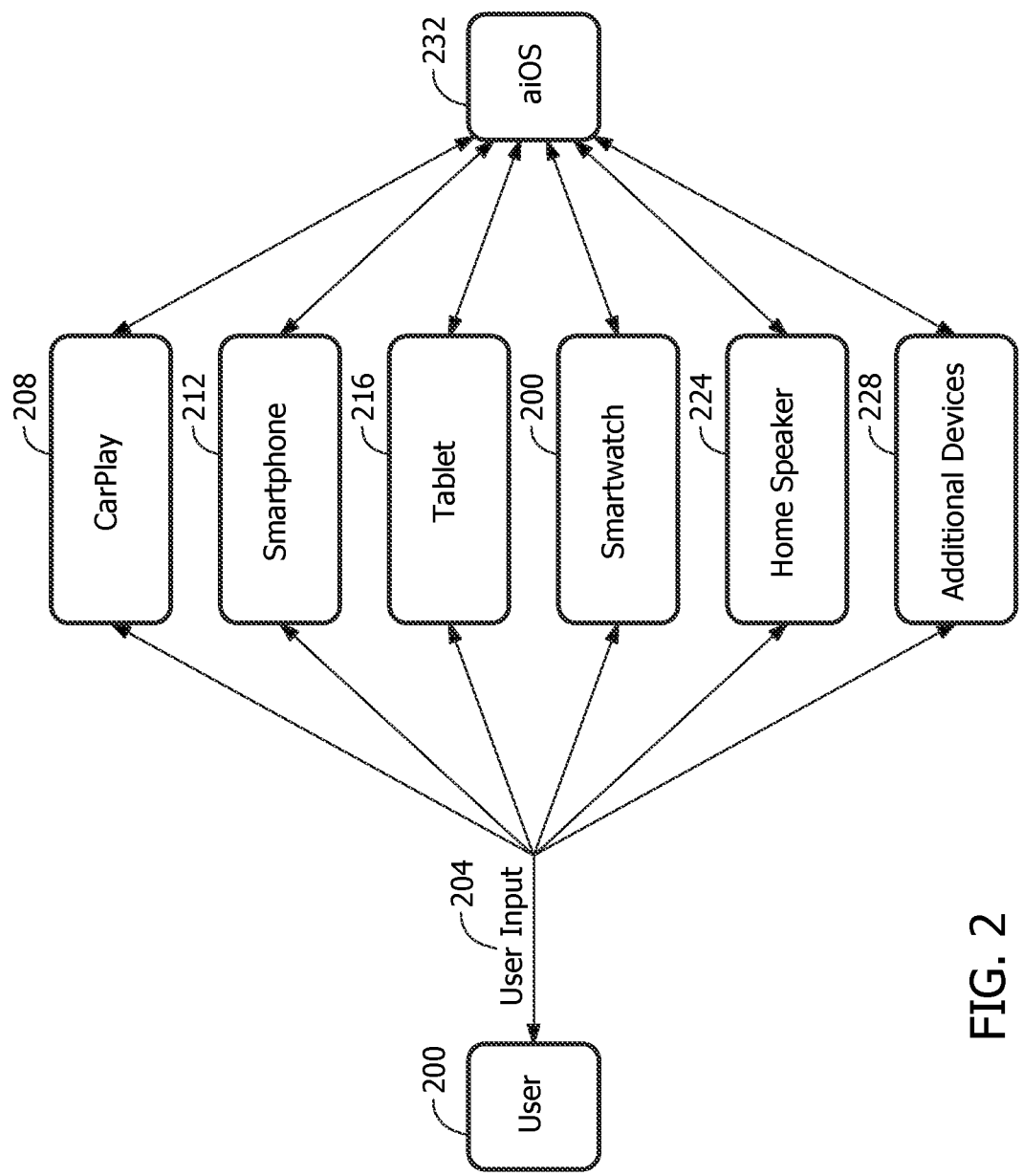
FIG. 2 illustrates how a user can communicate with multiple devices simultaneously using a single aiOS.

FIG. 2 details how a user can communicate with multiple devices simultaneously using a single aiOS. In FIG. 2, a user 200 provides user input 204 to any devices the user can directly interact with 208-228. These devices 208-228 then communicate directly with an aiOS 232.

Examples of devices the user 200 can interact with may include vehicle devices such as a CarPlay device 208, personal electronic devices such as a smartphone 212, or a tablet 216 (or personal computers, laptop devices), wearable devices such as a smartwatch 220 (or smart rings, glasses, hearing aids, headphones, earbuds), home devices such as a home speaker 224 (or security cameras, webcams, televisions, projection screen monitors, sound bars), or any other devices 228. The user 200 can interact with these devices 208-228 by providing user input comprising speech, text, or image data such as sending audio commands, text commands, or image or video files to a personal electronic device 208-220, receiving user output such as music, pictures, videos from home devices 224, or both (for example a smartphone 212 can both receive user input and provide user output).

Where a user 200 provides user input 204 to one or more devices 208-228, the user input 204 passes through the one or more devices 208-228 to the aiOS 232, which coordinates and facilitates user-device interaction and device-device interaction simultaneously. For example, the user 200 may be driving and wishes to check the weather. The user 200 may provide a user input 204 in the form of a voice input—"what is the weather"- to the smartphone 212. The smartphone 212 responds with its own output of the weather by display of text and images of the weather on the smartphone 212 screen, but simultaneously uses the aiOS 232 to transmit the same weather information to the CarPlay device 208. The aiOS 232 allows the CarPlay device 208 to receive the weather information provided by the smartphone 212 in a format the CarPlay device 208 can recognize (such as a text-only format) and process (such as reading the weather condition provided by the text-only format to the user via car speakers). Although discussed by way of example in connection with speech recognition, the aiOS may perform any AI-related function or service across numerous different hardware/software platform, such as but not limited to, audio, image, video, object, personalization, search, forecasting, text recognition, or any other prediction task involving any combination of text, audio, and visual inputs.

As would be understood, each of these devices may have significantly different hardware and may operate different operating systems. As such, the method and apparatus disclosed herein is configured to run on each of these devices there by being easily deployed across numerous different platforms. In addition, the user's speech database, preference database, history database is used by each installation across different platforms thereby improving operation.

Figure 3:
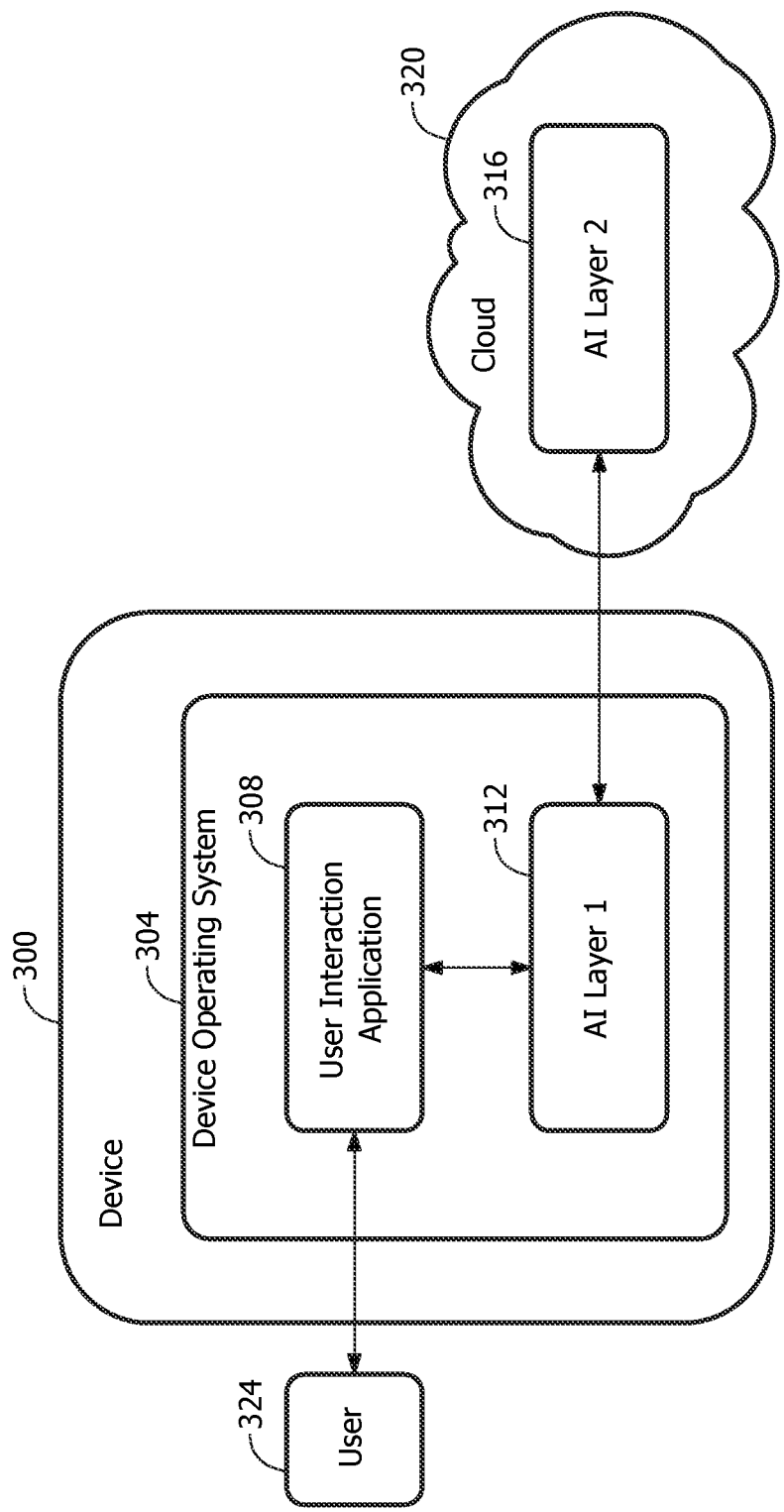
FIG. 3 illustrates a device configured to communicate with a cloud AI layer.

One aspect of novelty is that the method and apparatus disclosed herein can run distributed and has service discovery and awareness so that a device or instance may offload service requests to nearby devices, or the cloud installed versions of those services. FIG. 3 illustrates an embodiment where an AI layer may offload service requests to another AI layer stored in the cloud.

FIG. 3 illustrates a device configured to communicate with a cloud AI layer. The device 300 includes a device operating system 304. The device 300 may be any computing devices configured to execute one or more software applications and interact with the user. Installed in the device operating system 304 is a user interaction application 308. The user interaction application 308 may comprise any application software executable on the device that the user may interact with, such as but not limited to, a virtual assistant, music player, search engine, weather app, game, audio recorder, or calendar. Also installed in the device operating system 304 is a first AI layer 312. The first AI layer 312 is accessible to all applications installed in the device operating system 304, including the user interaction application 308. A second AI layer 316 is stored in a remote cloud-based database 320. The two AI layers 312, 316 may access each other via any type of electronic connection such as wired networks, optic communication, Wi-Fi, Bluetooth, cellular networks, mesh networks, etc.

Using the example discussed above, the user interaction application 308 may be a weather app that, in its original form, does not have speech recognition features. Thus, a user 324 may provide input comprising an audio input which the weather app may recognize as a service request that the weather app cannot fulfill. Thus, the weather app passes the service request to the first AI layer 312, attempts to use its own speech recognition feature to fulfill the service request. In one embodiment, the first AI layer 312 may first attempt to utilize the speech recognition feature provided on the device operating system's 304 to fulfill the service request.

If, however, the first AI layer 312 is unable to fulfill the service request (such as due to limitations of not having a built-in speech recognition feature), the first AI layer 312 may offload the service request to the second AI layer 316. The second AI layer 316 may use its own resources (such as the built-in speech recognition feature in the second AI layer 316) to fulfill the service request. The second AI layer 316 may then pass the information related to the fulfilled service request back to the first AI layer 312, and the first AI layer 312 will pass the information related to the fulfilled service request to the device operating system 304 for further processing as if the first AI layer 312 were the one that executed the conversion. Although discussed by way of example in connection with speech recognition, the AI layer may perform any AI-related function or service across numerous different hardware/software platform, such as but not limited to, audio, image, video, object, personalization, search, forecasting, text recognition, or any other prediction task involving any combination of text, audio, and visual inputs.

Figure 4:
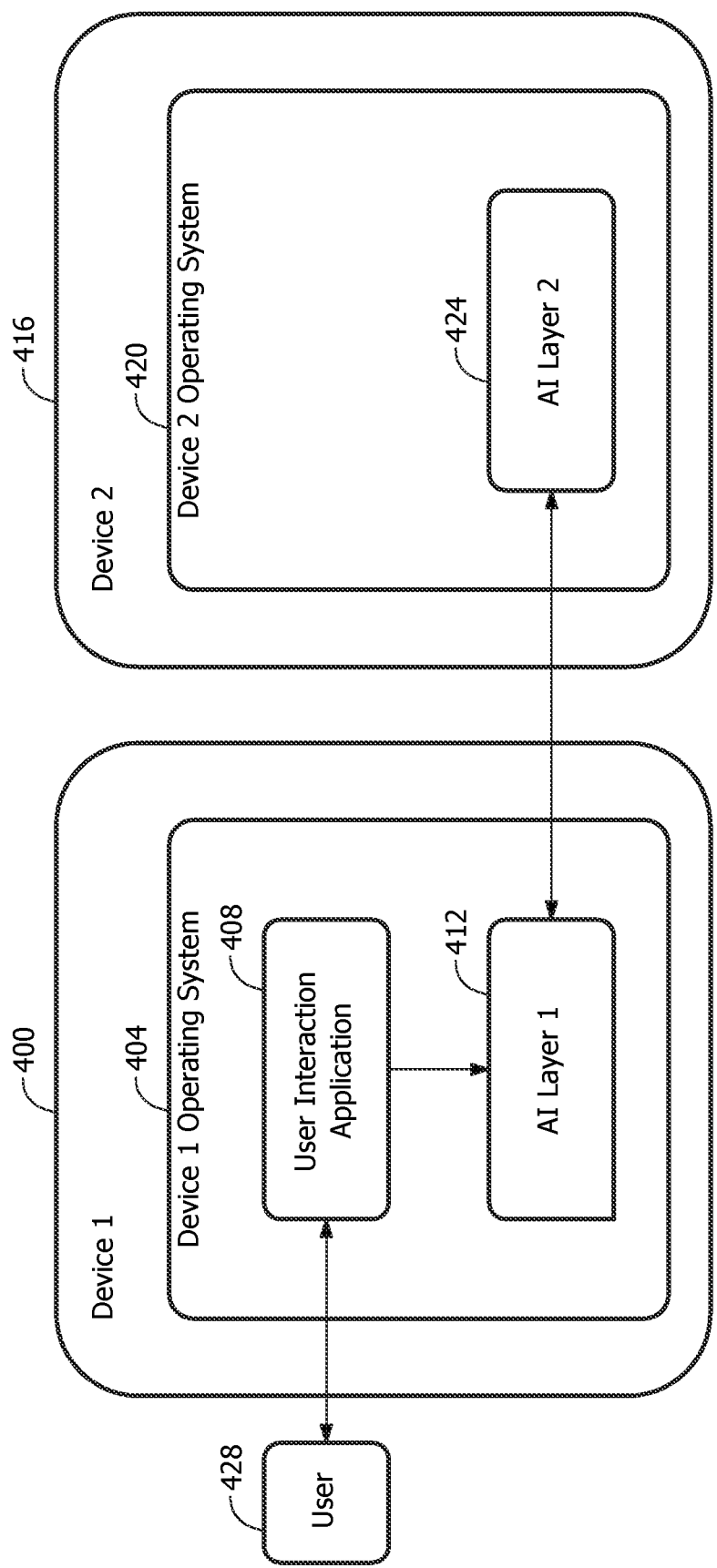
FIG. 4 illustrates a block diagram of an AI layer located on different devices.

FIG. 4 illustrates a block diagram of an AI layer located on different devices. In this embodiment, an AI layer in a first device may offload service requests to another AI layers stored in another device. The method and apparatus disclosed herein is horizontally scalable through its ability to have the application as defined in the glossary of terms connect device-to-device.

In FIG. 4, a first device 400 includes a first device operating system 404. Installed in the first device operating system 404 is a user interaction application 408. Also installed in the first device operating system 404 is a first AI layer 412. The first AI layer 412 is accessible to all applications installed in the first device operating system 404, including the user interaction application 408. A second device 416 includes a second device operating system 420. Installed in the second device operating system 420 is a second AI layer 424. The second AI layer is accessible to all applications installed in the second device operating system 420. The two AI layers 412, 424 may access each other via any type of electronic connection. such as wired networks, optic communication, Wi-Fi, Bluetooth, cellular networks, etc.

Using the example discussed above, the user interaction application 408 may be a weather app that, in its original form, does not have speech recognition features. Thus, a user 428 may provide input comprising an audio input which the weather app may recognize as a service request that the weather app cannot fulfill. Thus, the weather app passes the service request to the first AI layer 412, attempts to use its own speech recognition feature to fulfill the service request. In one embodiment, the first AI layer 412 may first attempt to utilize the speech recognition feature provided on the first device operating system's 404 to fulfill the service request.

If, however, the first AI layer 412 is unable to fulfill the service request (such as due to limitations of not having a built-in speech recognition feature), the first AI layer 412 may offload the service request to the second AI layer 424. The second AI layer 424 may use its own resources (such as the built-in speech recognition feature in the second AI layer 424) to fulfill the service request. In one embodiment, the second AI layer 424 may first attempt to utilize the speech recognition feature provided on the second device operating system 420 to fulfill the service request. The second AI layer 424 may then pass the information related to the fulfilled service request back to the first AI layer 412, and the first AI layer 412 will pass the information related to the fulfilled service request to the device operating system 404 for further processing as if the first AI layer 412 were the one that executed the conversion. Although discussed by way of example in connection with speech recognition, the AI layer may perform any AI-related function or service across numerous different hardware/software platform, such as but not limited to, audio, image, video, object, personalization, search, forecasting, text recognition, or any other prediction task involving any combination of text, audio, and visual inputs.

Figure 5:
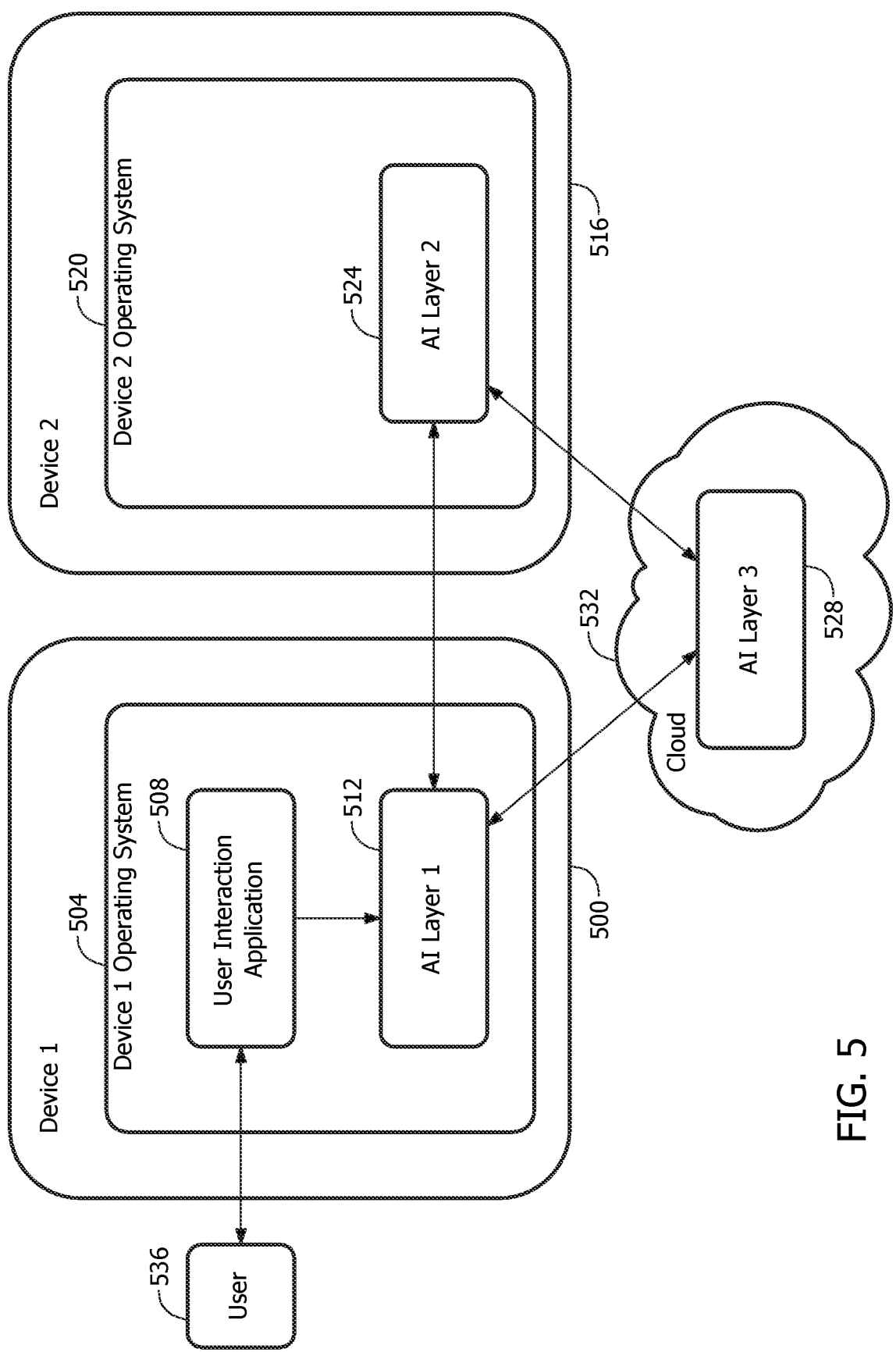
FIG. 5 illustrates an embodiment of this device-device-cloud deployment, where an AI layer may offload service requests to another AI stored in another device, which further offloads that service request to yet another AI stored in the cloud.

The second level of service request offload is through the combination of device plus cloud. FIG. 5 illustrates an embodiment of this device-device-cloud deployment, where an AI layer may offload service requests to another AI stored in another device, which further offloads that service request to yet another AI stored in the cloud.

In FIG. 5, a first device 500 includes a first device operating system 504. Installed in the first device operating system 504 is a user interaction application 508. Also installed in the first device operating system 504 is a first AI layer 512. The first AI layer 512 is accessible to all applications installed in the first device operating system 504, including the user interaction application 508. A second device 516 includes a second device operating system 520. Installed in the second device operating system 520 is a second AI layer 524. An AI layer 528 is stored in a remote cloud-based database 532. The three AI layers 512, 524, 528 may access each other via any type of electronic connection such as wired networks, optic communication, Wi-Fi, Bluetooth, cellular networks, etc.

Thus, a user 536 may interact with user interaction application 508 (a voice command such as "what is the weather" to a weather app) to create a service request (such as to retrieve weather information). Normally the user interaction application 508 utilizes first AI layer 512 to deploy the service request to the first device operating system 504 (such as by utilizing the speech recognition feature in the first AI layer 512 to fulfill the service request where the weather app does not have its own speech recognition feature). However, where first AI layer 512 is insufficient to perform such deployment (for example not having its own speech recognition feature), the first AI layer 512 may offload the service request to a second AI layer 524. If the second AI layer 524 is also insufficient to perform such deployment, the second AI layer 524 may further offload the service request to a third AI layer 528.

In one embodiment, the first AI layer 512 may, by default, first attempt to offload the service request to an AI layer on another device on the same network (such as the second AI layer 524), and such service request may only be offloaded to an AI layer on the cloud (such as the third AI layer 528) if the AI layers on devices cannot complete the service request. In one embodiment, the first AI layer 512 may determine which AI layer is preferred, including AI layers on clouds, and the service request may be offloaded to the preferred AI layer first.

In one embodiment, AI layer preferences may be automatically updated. For example, if a previous offload request is declined (such as if the AI layer malfunctioned, or the device on which the AI layer is stored has gone offline), that AI layer may no longer be designated as a preferred AI layer for a set period of time or indefinitely.

Upon accomplishing the service request, the third AI layer 528 may then transmit the service request back to the first AI layer 512 to be passed on to the first device operating system 504 for further processing. This device-device-cloud offloading process occurs on the backend such that from the perspective of the user interaction application 508, the first AI layer 512 carries out the service request.

Although discussed by way of example in connection with speech recognition, the AI layer may perform any AI-related function or service across numerous different hardware/software platform, such as but not limited to, audio, image, video, object, personalization, search, forecasting, text recognition, or any other prediction task involving any combination of text, audio, and visual inputs.

The system disclosed herein uses discovery to be deployed on multiple local and cloud instances. For example, a device like a watch may not have capability to process a complex video and may shunt that complex request to another local device such as a smartphone. The smartphone in turn may process the video frames with a local model to determine features of that video such as an emotion and speech inside the video. Finally, the stream of emotion and text is streamed to the cloud where a generic inference model of emotion and text determines the intent and fulfills the user's request from the video. The results may then be sent back to the user without the user knowing of the solution path.

Figure 6:
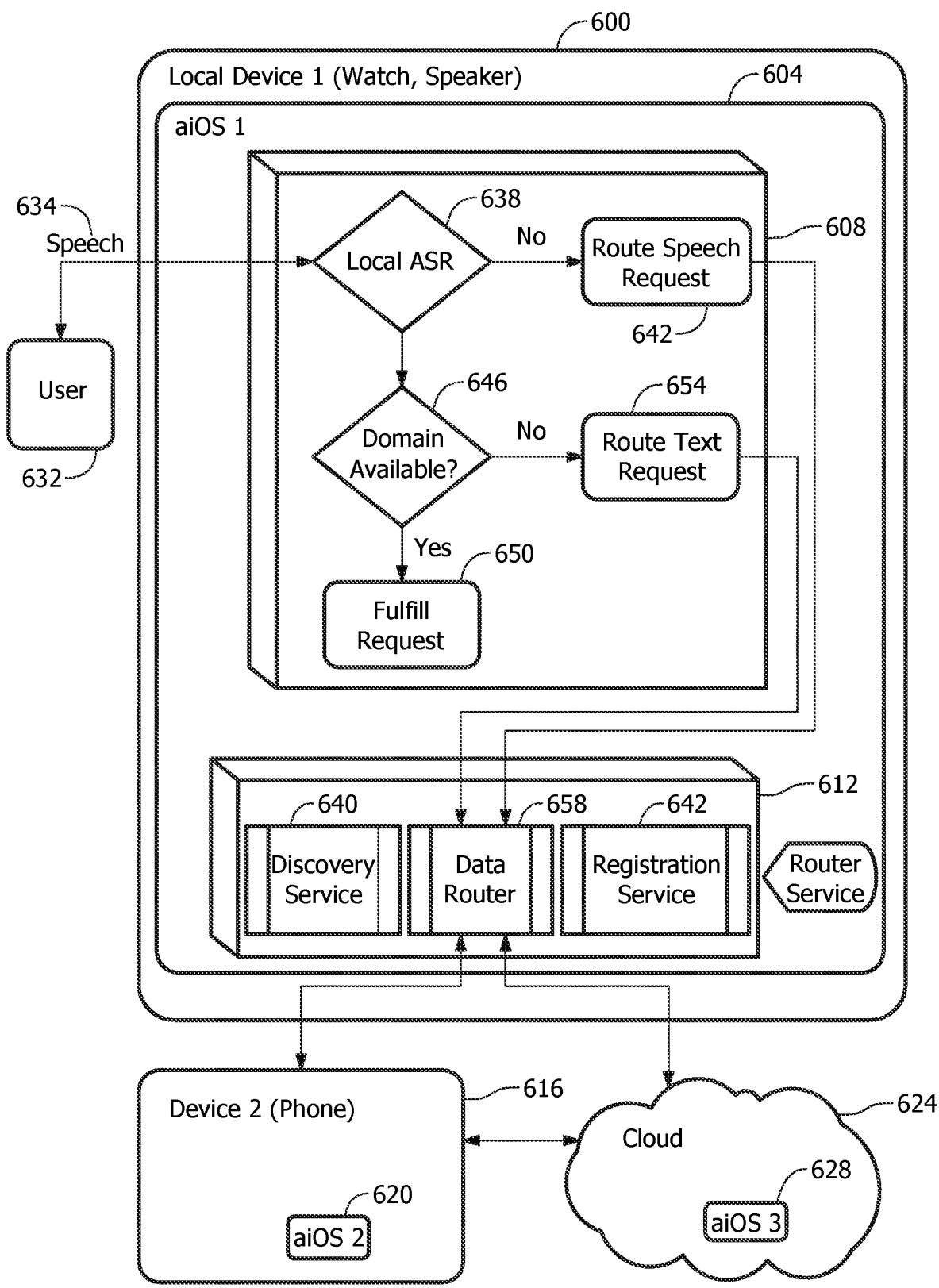
FIG. 6 demonstrates the life cycle of a service request being fulfilled across three separate aiOS residing in 3 different locations.

FIG. 6 demonstrates the life cycle of a service request being fulfilled across three separate aiOS residing in 3 different locations. In FIG. 6, a first local device 600 houses a first aiOS. The first local device 600 may be a user device with limited capabilities (such as a speaker with only audio capabilities, or a smartphone with simple speech recognition capabilities). The first aiOS 604 comprises a local service module 608 used to process requests that the first device 600 can fulfill locally, and a router service module 612 used to route service requests that the first device 600 cannot fulfill locally. A second device 616 houses a second aiOS 620. The second device 616 may be a more capable device such as a smartphone with advanced speech recognition and processing power. A cloud or remote cloud-based database 624 houses a third aiOS 628. The three aiOS 604, 620, 628 may access each other via any type of electronic connection. such as wired networks, optic communication, Wi-Fi, Bluetooth, cellular networks, etc.

As discussed in previous figures, when a user 632 attempts to interact with a user interaction application on the local device 600, and the user interaction application recognizes the user input as a service request that the user interaction application is unable to fulfill such as by not having one or more capabilities, the user interaction application may pass the service request to the first aiOS 604. The life cycle of a service request begins when the service request enters the first aiOS 604. In FIG. 6, the service request is in the form of a speech request 634, but a service request may be in any digital format.

The first aiOS 604 may first attempt to process the speech request 624 in its local service module 608. The local service module 608 may first attempt to use the automatic speech recognition ("ASR") feature 638 on the first local device 600 to process the speech request 634 locally (such as using software and hardware available on the local device 600 to convert the speech into a text request 654 format). If the local ASR 638 is unable to process the speech request 634 locally, the speech request may be routed 642 to the router service module 612 to offload the service request to another aiOS 620, 628.

If the local ASR 638 is able to process the speech input 634 locally, the local service module 608 may then attempt to fulfill the service request locally (such as using software and hardware available on the local device 600 or the first aiOS 604 to fulfill the service request) by locating a local domain 646 in the local device 600. A domain is a group of functions or modules used to administer a common set of rules or achieve a common goal (in this case, to process the service request). If the local service module 608 is able to locate a local domain 646, the local service module 608 will utilize the located domain to fulfill the service request locally 650. If the local service module 608 is unable to locate a local domain, the text request may be routed 654 to the router service module 612 to offload the service request to another aiOS 620, 628.

Upon receiving the routed speech request 642 or text request 654, the router service module 612 may utilize a data router 658 to send the routed speech request 642 or text request 654 to another aiOS 620, 628. In FIG. 6, routed service requests are in the form of speech request 642 and text request 654, but service requests may be in any digital format.

In one embodiment, a discovery service 640 may cause the data router 658 to first attempt to offload the service request to an aiOS on another device on the same network first (such as the second aiOS 620), and such service request may only be offloaded to an aiOS on the cloud (such as the third aiOS 628) only if the aiOS on devices cannot complete the service request. In other embodiments, a cloud offload may be attempted before an offload to the second device 616. It is also contemplated that the offload may occur to both the cloud 624 and the second device 616 to ensure operational effectiveness. Discovery services are a common nomenclature for finding out about services that reside on other devices or on other parts of the network.

In one embodiment, a registration service module 642 may determine which aiOS is preferred, including aiOS on clouds, and the service request may be offloaded to the preferred aiOS first. Service registrations describe how the software finds services that are provided from the cloud and other device layers. For example, an image processing model may only be available on an aiOS stored in the cloud and not on an aiOS stored on a device. The registration service 642 may determine where such image processing model exists and select the best processing model.

In one embodiment, the registration service module 642 may automatically update aiOS preferences. For example, if a previous offload request is declined (such as if the aiOS malfunctioned, or the device on which the aiOS is stored has gone offline), that aiOS may no longer be designated as a preferred aiOS for a set period of time or indefinitely.

Upon fulfilling the routed service request, the second aiOS 620 or the third aiOS 628 may then route the service request back to the first aiOS 604 for further processing or passed on to the operating system on the first device 600 for further processing.

Figure 7:
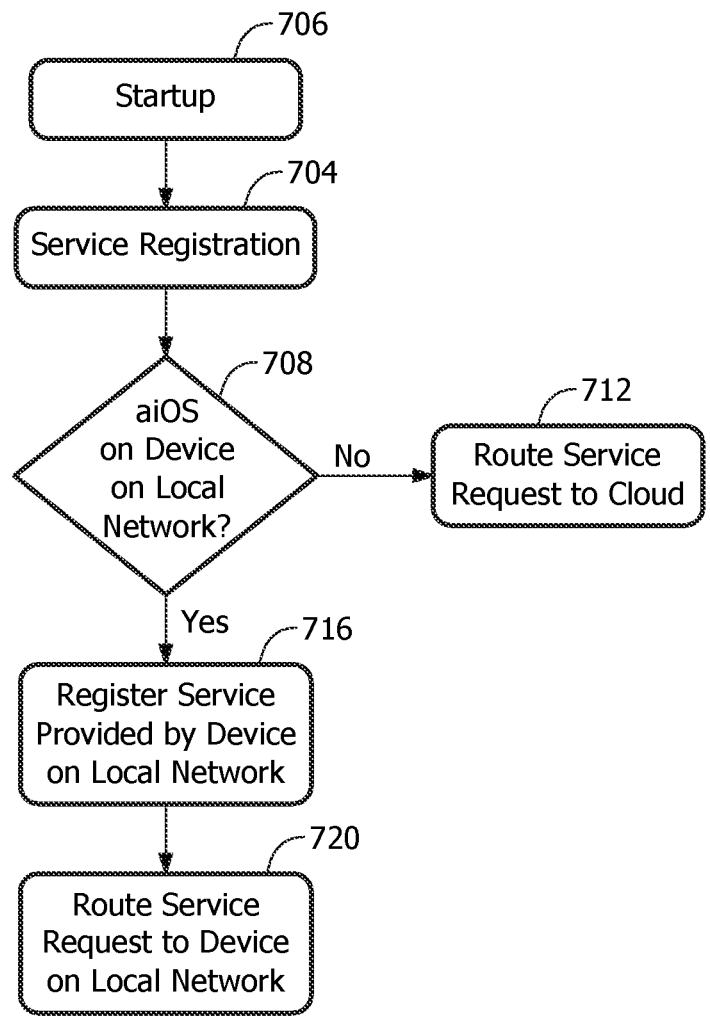
FIG. 7 is an operational flow diagram illustrating an exemplary process for routing a service request.

FIG. 7 is an operational flow diagram illustrating an exemplary process for routing a service request. In this example method of operation, the service request is routed from an aiOS or AI layer on one device to an aiOS or AI layer on another device or to an aiOS or AI layer on a cloud using the discovery service and registration service.

At a step 700, the router service module is activated when the aiOS or AI layer on a device determines it cannot fulfill a service request locally and designates the service request for routing to another aiOS or another AI layer. For example, the user designates a photo for facial recognition on their smartwatch. The AI layer on the smartwatch is not capable of performing facial recognition locally. The AI layer on the smartwatch thus activates its router service module to prepare to offload the facial recognition service request to another aiOS or AI layer.

At a step 704, the registration service determines what service is required to fulfill the service request 704 and what accessible aiOS or AI layer provide such services. Using the example above, accessible aiOS or AI layer may comprise an AI layer on a smartwatch, an AI layer on a smartphone, an AI layer on a speaker, and an aiOS on a cloud. The registration service on the AI layer on the smartwatch may determine that the AI layer on the smartphone and the aiOS on the cloud have facial recognition features. Thus, the registration service on the AI layer of the smartwatch may register the facial recognition service of the AI layer on the smartphone and the aiOS on the cloud ("registered devices") as possible services to be used.

At a step 708, the discovery service performs Wi-Fi discovery or any type network discover, to determine which of the registered devices are accessible via the local network. Wi-Fi discovery uses standard network discovery layers such as Universal Plug and Play (UPnP), Service Location Protocol, and other protocols to find the aiOS or AI layer on devices accessible via the local network. Using the example above, the discovery service may cause the AI Layer on the smartphone to announce the search for local devices and perform the search via these standard protocols to enable the AI Layer to find instances of itself locally for feature resolution. In one embodiment, the discovery service may also perform other possible xNFC or Near Field Communication discovery.

If no registered services are accessible via the local network (such as, in the previous example, the AI layer on the smartphone appears to be offline), then at a step 712, the router service module may route the service request to a cloud-based aiOS or AI layer (such as, in the previous example, the aiOS on the cloud).

If, on the other hand, the discovery service identifies a registered service as accessible via the local network, then at a step 716, the registration service will register the identified service. Using the previous example, if the AI layer on the smartphone appears to be accessible via the local network, then the registration service will register the service on the AI layer on the smartphone as an identified service. At a step 720, upon registration of identified service, the router service module may route the service request to the one or more identified services on the local network (such as the AI layer on the smartphone).

Figure 8:
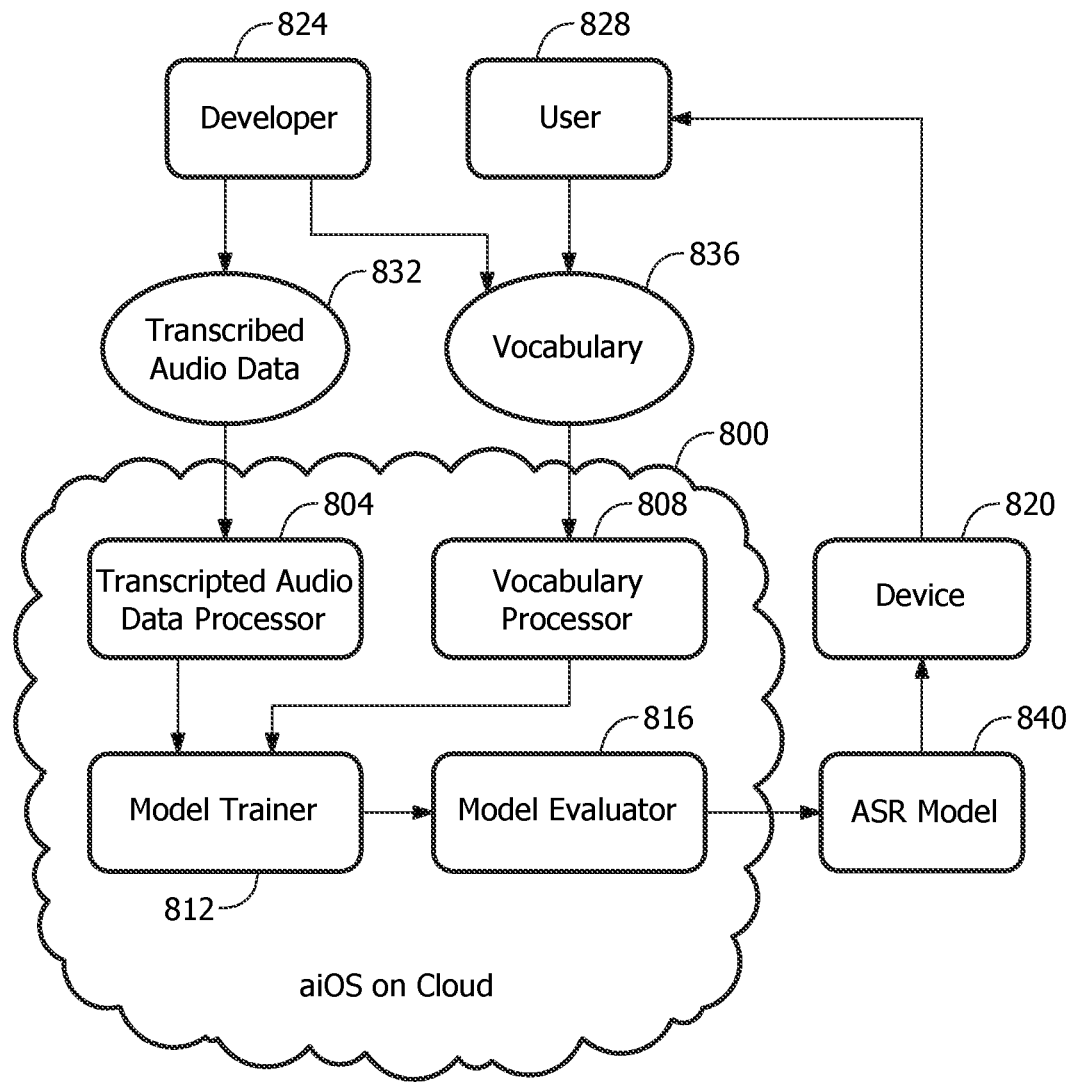
FIG. 8 is a flow chart of an example method of aiOS training.

FIG. 8 is a flow chart of an example method of aiOS training. In the method of FIG. 7, an example of speech recognition is used to illustrate the training operation and interaction as to how both, developers, and users, may contribute to the training of an aiOS or AI layer, and using the trained data to create a deployable AI model. In FIG. 8, an aiOS is stored in a cloud 800, such as in a non-transitory state in memory, and is executable by one or more processors 804, 808 used to process data input, a model trainer 812 used to train AI data, and an AI model evaluator 832 used to create models for deployment on devices 820 such as a smartphone, tablet, or any other device. FIG. 8 illustrates an aiOS stored in a cloud or remote cloud-based server, however, this training and deployment model applies to any aiOS or AI layer stored on any device, cloud, or server.

Data input may be any input by a developer 824 or a user 828 of a device 820. A developer 824 input may comprise product inventory, language dataset, or any set of information the model trainer 812 may be used to train the AI model. Developers may write programs where when their users output ASR, image, or NLP (all 3 can be inputted at one time). Using the example of speech recognition, the developer 824 may upload a user dataset comprising transcribed audio data 832. The user 828 may input one or more sets of vocabulary by interacting with the device 820. The vocabulary may comprise a library of terms with associated speech patterns, and/or additional associated data, that are specific to a particular topic, person, field, language, or any other specific attribute. The developer 824 may also create, add, or supplement the user dataset through his own interaction with a device 820. FIG. 8 illustrates the example of speech recognition, but this training and deployment model applies to any type of user input for the purpose of training data and deploying models for any AI service, such as but not limited, to sounds, music, images, patterns, mathematical equations, products, videos, or any other subject matter type or model.

The aiOS 800 may use any type processor to process data input. For speech recognition, the aiOS may use a transcribed audio data processor 804 to process transcribed audio data 832 (digitized speech) and a vocabulary processor 808 to process vocabulary 836. FIG. 8 also illustrates the processing of speech recognition-related data input only, but the aiOS or AI layer may comprise processors for any type of user input.

A model trainer 812 uses the processed data from the processors 804, 808 to train existing data stored in the aiOS 800, such as existing data stored in memory of the cloud computing environment. aiOS 800, such as existing data stored in memory of the cloud computing environment. Using speech recognition as an example, the model trainer 812 may update existing speech recognition algorithms or add new speech recognition algorithms. This would have the effect of enhancing accuracy or suitability of the model for a specialized task or user. FIG. 8 illustrates the training of speech recognition-related data input only, but this training process may apply to any type of AI service-related data.

Upon completion of training, the model evaluator 816 may determine if an existing AI service model should be updated. This determination may be based on time since last update, the extent of the changes to the AI service model, periodically, upon any change to the AI service model, or any other basis. Using speech recognition as an example, the device 820 may include a user interacting application that currently uses a first version of an ASR model. Upon completion of training, the model evaluator 816 may determine that the first version of ASR model is no longer suitable to process the new vocabulary data 836 provided by a user 828. Thus, the model evaluator 816 may determine that the first version of ASR model requires an updated model. FIG. 8 illustrates the evaluation of the ASR model only, but this evaluation process may apply to any type of AI service model.

Upon determining an existing model should be updated, the model evaluator 816 may gather metrics from the trained data to create an updated model for deployment. Using speech recognition as an example, the model evaluator 816 may create a second version of the ASR model 840 for deployment to the device 820. FIG. 8 illustrates the creation and deployment of an ASR model only, but this creation and deployment process may apply to any type of AI service model onto any device.

Upon deployment, the device 826 may continue to interact with the user 828 (and vice versa), and the user may continue to contribute new vocabulary data 836 for model training and creation.

Figure 9:
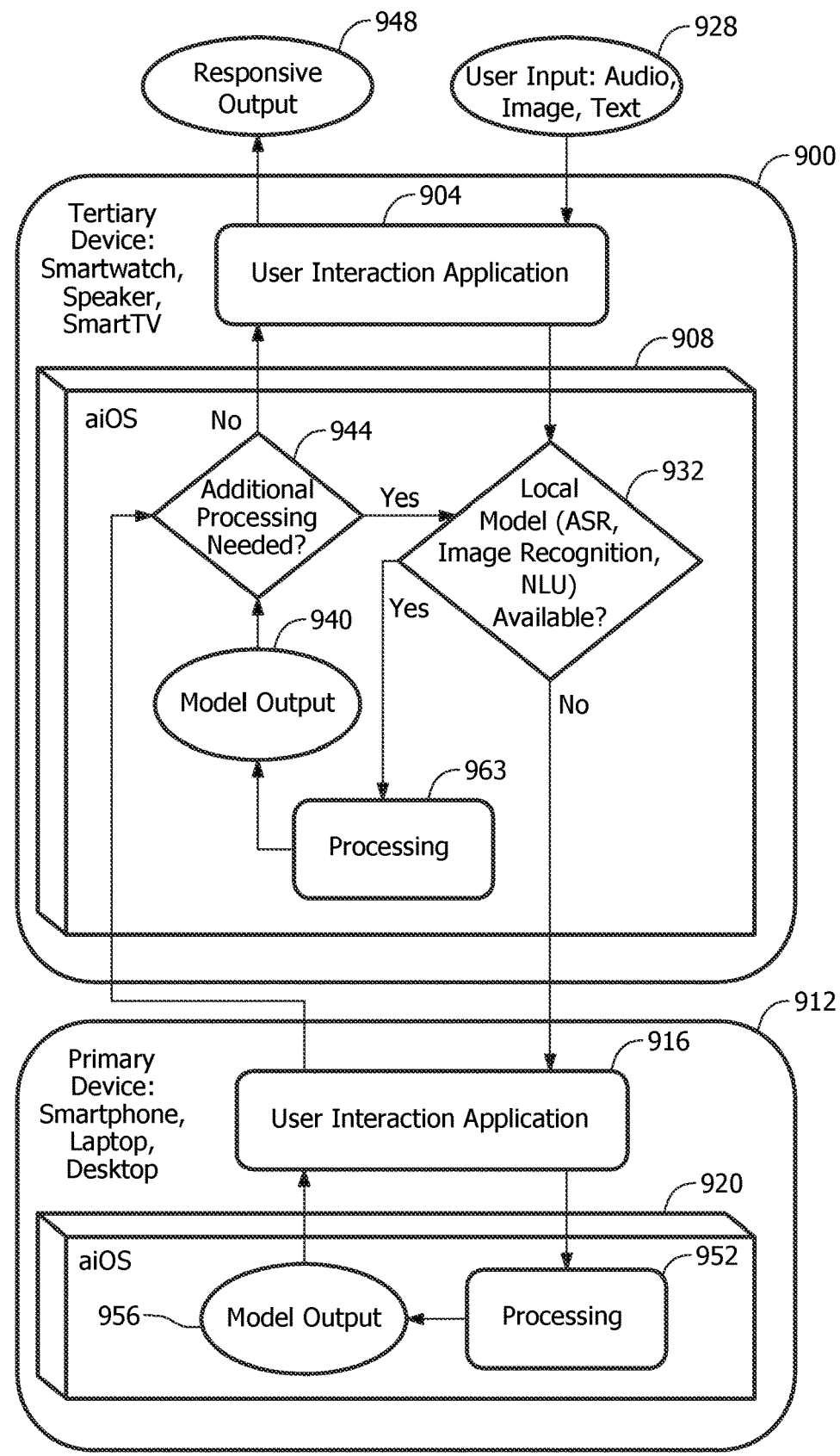
FIG. 9 illustrates a flow chart of an exemplary life cycle of a user-facing request being fulfilled with local and tertiary devices.

FIG. 9 illustrates a flow chart of an exemplary life cycle of a user-facing request being fulfilled with local and tertiary devices. A user-facing request is a type of service request where a user inputs a query that prompts an output in the form of a response to that query. For example, a user may ask the device 900 to "find me a recipe with chicken." The device may output a response of "here is a great recipe with chicken."

In FIG. 9, a tertiary device 900 houses one or more tertiary user interacting applications 904 and a tertiary aiOS 908. Tertiary devices 900 may be devices with limited AI capabilities, such as wearable devices (smartwatches, smart rings, glasses, hearing aids, earbuds, headphones, etc.), home devices (speakers, security cameras, televisions, projection screen monitors, etc.), CarPlay devices, or any other devices with limited AI capabilities (webcams, sound bars, etc.). A primary device 912 houses one or more primary user interacting applications 916 and a primary aiOS 920. Primary devices 912 may be devices with more robust AI capabilities, such as smartphones, tablets, personal computers, laptop devices, etc. The tertiary and primary user interacting applications 904, 916 may be the same (such as a weather app installed on a smartwatch and a smartphone). The tertiary aiOS 908 may access one or more primary user interacting applications 916 and the primary aiOS 920 via any type of electronic connection, such as a wired or wireless connection. Similarly, the primary aiOS 920 may access one or more tertiary user interacting applications 904 and the tertiary aiOS 908 via any type of electronic connection, such as a wired or wireless connection.

When a user attempts to interact with a tertiary user interaction application 904 via user input 928, and the tertiary user interaction application 904 may recognize the user input 928 as a service request that the tertiary user interaction application 904 is unable to fulfill such as by not having one or more capabilities. The user input 928 may comprise audio input, image input, text input, or input of any digital format. For example, the user may interact with the weather app on his smartwatch via an audio command "what is the weather today?" The weather app may not have speech recognition features to process the audio command.

The tertiary user interaction application 904 may then pass the service request to the tertiary aiOS 908. This user interaction application 904 to aiOS offload of service request is discussed in more details in FIGS. 1-7. The life cycle of a user-facing request begins when the user input 928 enters the tertiary aiOS 908. Although discussed by way of example in connection with the user input 928 on the tertiary aiOS 908, the life cycle of a user-facing request may begin when a user input enters any aiOS or AI layer on any device.

The tertiary aiOS 908 may first attempt to fulfill the request locally by determining whether local models 932 are available to process the user input 928. Local models may be modules, features, or functions on the tertiary aiOS 908 or the operating system on the tertiary device 900 capable of satisfying the user request. The user input 928 may be processed and output in both static (such as displaying a text or image) and streaming (such as playing an audio or video) fashion.

If a local model 932 is found, the tertiary aiOS 908 may process 936 the user input 928 until the service request can be fulfilled. For user-facing requests, such process 936 may comprise generating one or more outputs 940. Some user-facing requests may require one or more rounds of processing 944 to fulfill. For example, a user input 928 may comprise an audio that is first processed by an ASR model, generating an ASR output. The ASR output is then processed by a NLU (natural language understanding) model to generate an NLU output which fulfills the service request. A NLU model is a natural language understanding model that processes utterances or sequences of utterances, in an attempt to comprehend the language used by the user. An utterance may be in the form of a user query. A user-facing request is fulfilled when a responsive output is generated. The output may be responsive to the user request itself, in which case the tertiary aiOS 908 directly cause the tertiary device 900 to present to the responsive output to the user 948. Or the output may be an intermediate output which the tertiary aiOS 908 may send to the user interactive application 904 to complete processing, and the user interactive application 904 may complete the final steps of fulfilling the service request itself, and then cause the tertiary device 900 to present a responsive output 948 to the user.

If the tertiary aiOS 908 is unable to process the user input 928 locally, the user input 928 may be routed to a primary user interaction application 916. If the primary user interaction application 916 is also unable to process the user input 928, it may send the user input 928 to the primary aiOS 920. In one embodiment, the tertiary aiOS 908 may route the user input 928 directly to the primary aiOS 920.

Upon receiving the user input 928, the primary aiOS 920 may repeat the process in the first aiOS 932-944 until the user input 928 is fully processed 952 and a responsive output 956 is generated. The primary aiOS 920 may then send the responsive output 956 back to the primary user interaction application 916, which may send the responsive output 956 to the tertiary aiOS 908. In one embodiment, the primary aiOS 920 may send the responsive output 956 directly to the tertiary aiOS 908. The tertiary aiOS 908 may then send the responsive output 956 to the tertiary user interaction application 904 to present to the user.

Using the example above, the smartwatch weather app may not be able to process the user audio command "what is the weather today?" The smartwatch weather app may send the audio command to the smartwatch aiOS. If the smartwatch aiOS determines it is unable to process the audio command locally, the audio command may be routed to the smartphone weather app. If the smartphone weather app cannot process the audio command, then the audio command may be sent to the smartphone aiOS. The smartphone aiOS may process the audio command locally on the smartphone (such as converting the audio command into a text command that the smartwatch weather app can recognize and process). The text command may then be sent back to the smartphone weather app, then to the smartwatch aiOS, then to the smartwatch weather app, where the text command is processed into a text or image display of the weather on the smartwatch, or an audio output by the smartwatch to inform the user of the current weather.

In one embodiment, the tertiary aiOS 908 may fulfill a first portion of the user-facing request locally, and only offload a second portion of the user-facing request to the primary aiOS 920. For example, the tertiary aiOS 908 may comprise an ASR model, while the primary aiOS 920 may comprise an ASR model and an NLU model. The tertiary aiOS 908 may use the local ASR model to perform part of the user-facing request and generate an ASR output, which the tertiary aiOS 908 may then route to the primary aiOS 920. The primary aiOS 920 may then use its NLU model to complete the user-facing request.

In one embodiment, the aiOS and AI layer on one or more tertiary devices, one or more primary devices, and/or one or more cloud or remote cloud-based servers may all access each other and offload user-facing requests, and any other service requests, to one or more other aiOS and/or AI layers.

Figure 10:
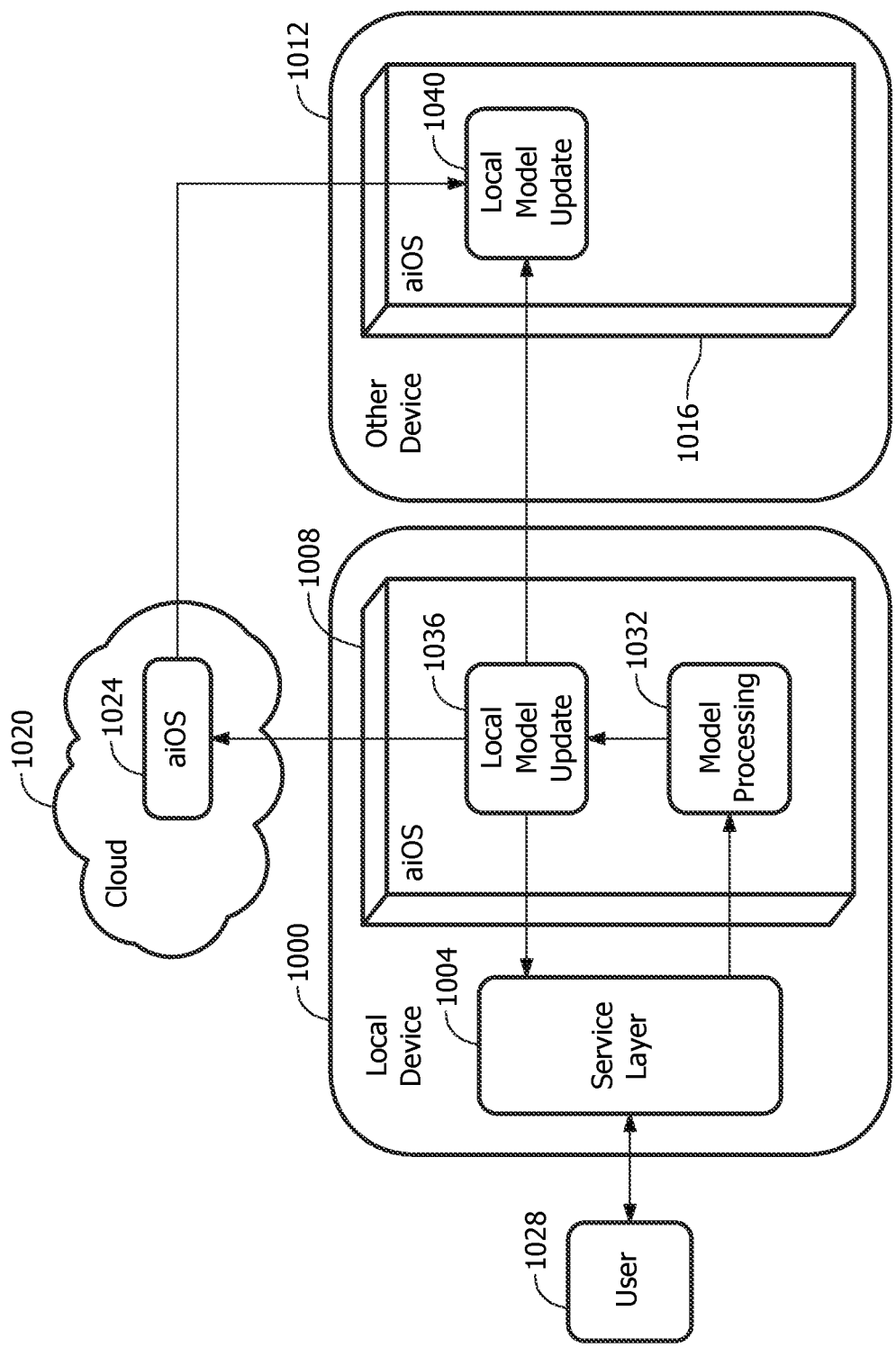
FIG. 10 illustrates a flow chart of an exemplary method distributing a local update to an ML model from the aiOS on a local device to one or more other aiOS.

FIG. 10 illustrates a flow chart of an exemplary method distributing a local update to an ML model from the aiOS on a local device to one or more other aiOS. "ML models" are defined as the learned generic function that is used to process data. Although discussed by way of example in connection with the ML models, this distribution may apply to updates for any AI or machine learning based models. The term "model" is defined as a function or group of functions used to achieve some prediction or forecast.

In FIG. 10, a local device 1000 houses a service layer 1004 and a first aiOS 1008. Local devices may be any tertiary devices or primary devices. Service layers may be any operating system that can access the aiOS or AI layer on its device, or any user interaction application installed in the operating system that can access the aiOS or AI layer on its device. Another device 1012 (such as another tertiary device or another primary device) houses a second aiOS 1016. A cloud or remote cloud-based server 1020 houses a third aiOS 1024. The three aiOS 1008, 1016, 1024 may access each other via any type of electronic connection, such as a wired or wireless connection. Although discussed by way of example in connection with aiOS, this distribution may apply both aiOS and AI layers.

A user 1028 input to the service layer 1004 may prompt the first aiOS 1008 to process the input for model update 1032. Model processing may comprise input processing, data training, and model evaluation, as discussed in FIG. 8. Although discussed by way of example in connection with user input on a service layer in a local device, a developer may also prompt model updates using data sets or any other input by the developer. The aiOS or AI layer may also automatically initiate updates (such as periodic maintenance or updates based on third-party services or data).

Upon generating the updated model, the first aiOS 1008 may deploy the model locally 1036 to the service layer 1004 and remotely 1040 to the second aiOS 1016. The service layer 1004 may provide feedback of the model update to the user 1028. The second aiOS 1016 may deploy the model locally on the service layer of the other device 1012. The updated model may also be deployed to the third aiOS 1024 on the cloud 1020. In one embodiment, the updated model is deployed to all local and remote devices and/or clouds simultaneously. In one embodiment, the updated model may be deployed in a specific order, or only deployed to specified aiOS or AI layers, based on user preferences, developer preferences, and/or available resources (such as available mobile data for uploading).

In one embodiment, updated models deployed to remote devices or clouds may prompt further deployment. For example, while the first aiOS 1008 on the local device 1000 may not have access to a fourth aiOS on a third device, the third aiOS 1024 on the cloud may have access to the fourth aiOS through a different electronic connection. Thus, upon receiving the model update from the first aiOS 1008, the third aiOS 1024 may further deploy the model update to the fourth aiOS. The fourth aiOS may then deploy the model update locally on the third device, and further deploy the model update to aiOS or AI layers in its network. This relay of deployment may occur until all aiOS and AI layers have received the model update, and all devices with an aiOS or AI layer have been updated with the model update. This branching method of distribution across all devices and clouds takes advantage of the cloud's consistency across multiple devices as well as the processing power of the various devices.

Although discussed by way of example in connection with a local device initiating the model process and updating procedure, this procedure may be initiated and performed on aiOS and AI layers stored in any device and any clouds or remote cloud-based servers.

Figure 11:
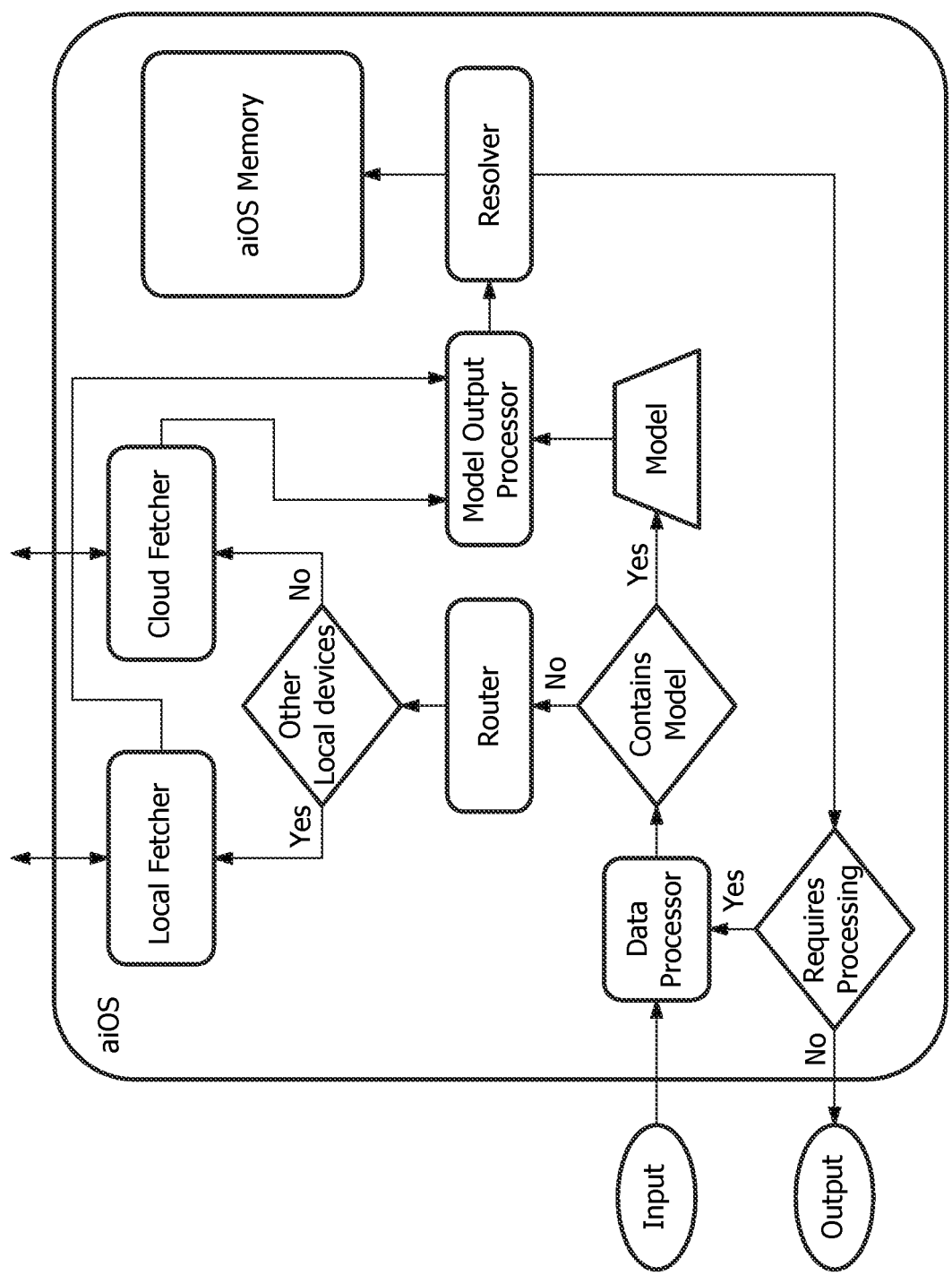
FIG. 11 illustrates a flow chart of a generic lifecycle of processing a user request using the aiOS.

FIG. 11 illustrates a flow chart of a generic lifecycle of processing a user request using the aiOS. The user input (e.g., audio, text, video) is received by the data processor which categorizes data and sends it to the appropriate ML (machine learning) model if contained locally or to a router to retrieve model output.

If remote, the router will attempt to fetch resources from other local devices before accessing aiOS cloud resources. Any model output, local or remote, will be processed by the model output processor in a streaming or static fashion. All model output will use resolver to either return output or be processed by a subsequent model. Fetcher is defined as the retrieval of the necessary data to complete the query either locally or from the cloud.

Figure 12:
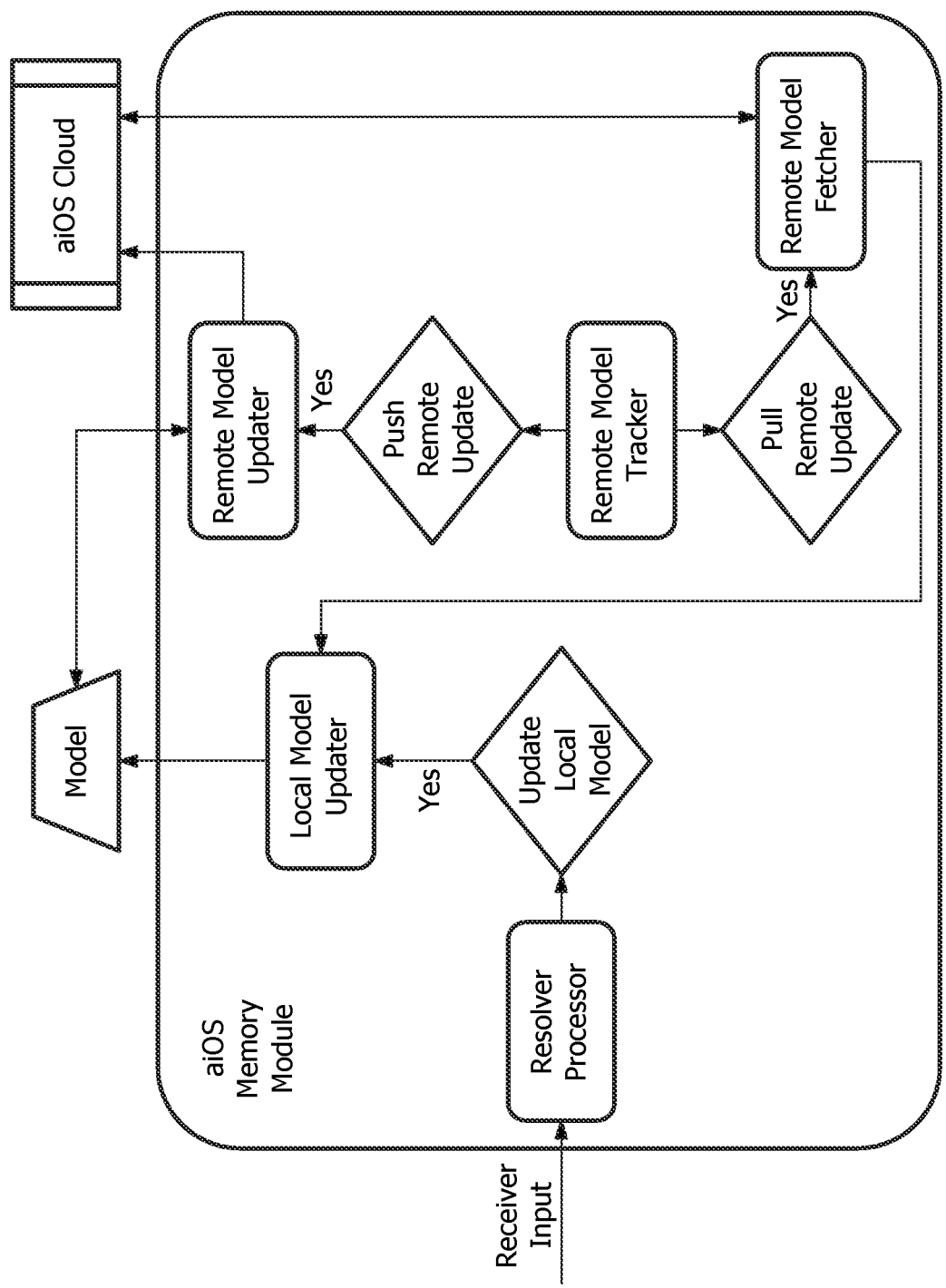
FIG. 12 illustrates a flow chart of receiver input to demonstrates the aiOS memory module which keeps track of local updates to model as well as when the local model is receiving an update remotely from aiOS.

FIG. 12 illustrates a flow chart of receiver input to demonstrates the aiOS memory module which keeps track of local updates to model as well as when the local model is receiving an update remotely from aiOS. Whenever an action is resolved by aiOS the resolver sends an update to aiOS Memory Module which will update the local model for future interactions. Within the Memory Module there is a Remote Model tracker which tracks the need for updates to and from aiOS Cloud. When remote models are publishing an update, the Remote Model Fetcher will pull the update and send it to the local model updater. When the local model has had enough local changes, the remote model tracker will push a remote update to the aiOS Cloud which can then be used by all devices synced up with aiOS.

Figure 13:
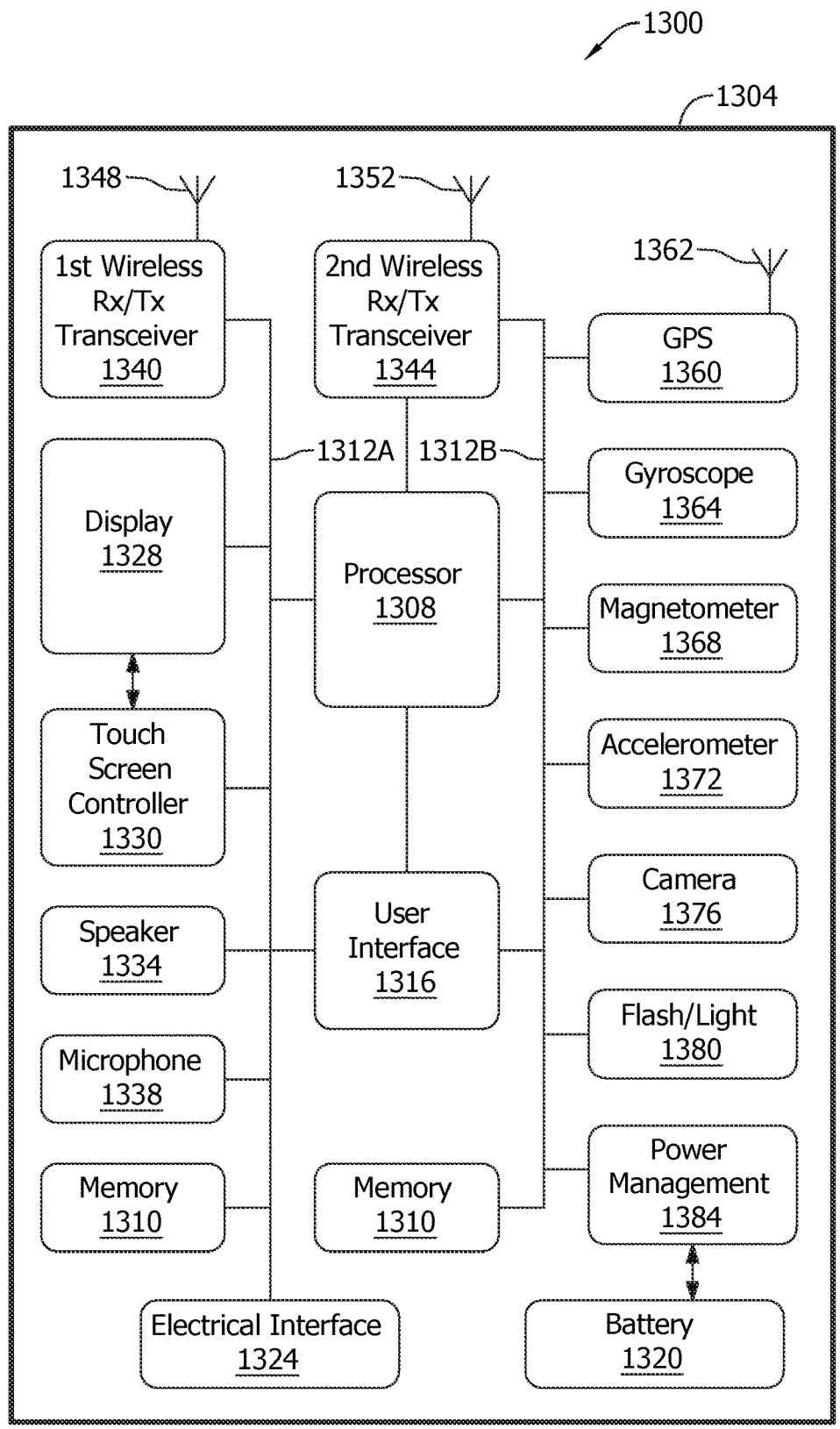
FIG. 13 illustrates a block diagram of an exemplary user device.
Figure 14:
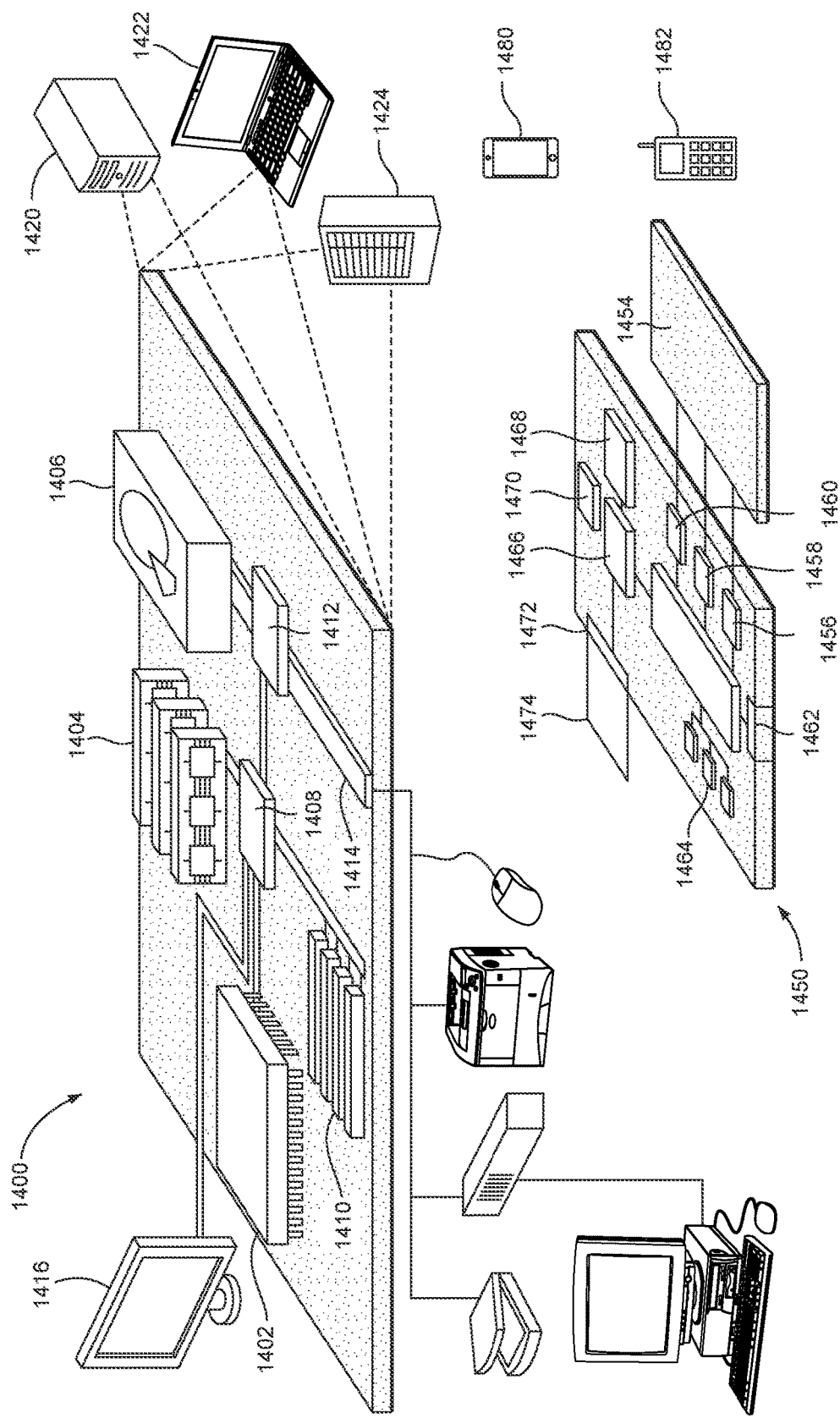
FIG. 14 illustrates an example embodiment of a computing, mobile device, or server in a network environment.

As shown in FIGS. 13 and 14, the system includes network connection over which network traffic and data are exchanged. Also part of the system are one or more servers and one or more databases. The databases may be associated with the servers, the user device, or may be third party databases. The user device of the system is composed of a user facing device capable of mixed input methods, either in audio or visual, a camera and/or microphone. Additionally, it can have some mixed form of display for the user in the form of lights, display, speakers, or haptics. The device may either be in a handheld, fixed installation, as in a TV or wall mounted item, or moveable item form factor, such as in a tabletop display. This device may either be activated by the user or prompt the user that it is active if the internal system determines it should be listening. The activation process can be triggered by a combination of audio-visual signals. Once activated the device transitions into a listening state in which it is recording audio for purposes of transcription. Any component of the system may transcribe or translate audio to text using a combination of models. These models are 1 per language and dialect (e.g., US-Spanish and Spain-Spanish would be considered separate models).

FIG. 13 illustrates an example embodiment of a mobile device, also referred to as a user device which may or may not be mobile. This is but one possible mobile device configuration and as such it is contemplated that one of ordinary skill in the art may differently configure the mobile device. The mobile device 1300 may comprise any type of mobile communication device capable of performing as described below. The mobile device may comprise a PDA, cellular telephone, smart phone, tablet PC, wireless electronic pad, an IoT device, a "wearable" electronic device or any other computing device.

In this example embodiment, the mobile device 1300 is configured with an outer housing 1304 configured to protect and contain the components described below. Within the housing 1304 is a processor 1308 and a first and second bus 1312A, 1312B (collectively 1312). The processor 1308 communicates over the buses 1312 with the other components of the mobile device 1300. The processor 1308 may comprise any type processor or controller capable of performing as described herein. The processor 1308 may comprise a general purpose processor, ASIC, ARM, DSP, controller, or any other type processing device. The processor 1308 and other elements of the mobile device 1300 receive power from a battery 1320 or other power source. An electrical interface 1324 provides one or more electrical ports to electrically interface with the mobile device, such as with a second electronic device, computer, a medical device, or a power supply/charging device. The interface 1324 may comprise any type electrical interface or connector format.

One or more memories 1310 are part of the mobile device 1300 for storage of machine-readable code for execution on the processor 1308 and for storage of data, such as image data, audio data, user data, location data, accelerometer data, or any other type of data. The memory 1310 may comprise RAM, ROM, flash memory, optical memory, or micro-drive memory. The machine-readable code (software modules and/or routines) as described herein is non-transitory.

As part of this embodiment, the processor 1308 connects to a user interface 1316. The user interface 1316 may comprise any system or device configured to accept user input to control the mobile device. The user interface 1316 may comprise one or more of the following: microphone, keyboard, roller ball, buttons, wheels, pointer key, camera (still and video), touch pad, and touch screen. A touch screen controller 1330 is also provided which interfaces through the bus 1312 and connects to a display 1328.

The display comprises any type display screen configured to display visual information to the user. The screen may comprise a LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display 1328 receives signals from the processor 1308 and these signals are translated by the display into text and images as is understood in the art. The display 1328 may further comprise a display processor (not shown) or controller that interfaces with the processor 1308. The touch screen controller 1330 may comprise a module configured to receive signals from a touch screen which is overlaid on the display 1328.

Also part of this exemplary mobile device is a speaker 1334 and microphone 1338. The speaker 1334 and microphone 1338 may be controlled by the processor 1308. The microphone 1338 is configured to receive and convert audio signals to electrical signals based on processor 1308 control. Likewise, the processor 1308 may activate the speaker 1334 to generate audio signals. These devices operate as is understood in the art and as such are not described in detail herein.

Also connected to one or more of the buses 1312 is a first wireless transceiver 1340 and a second wireless transceiver 1344, each of which connect to respective antennas 1348, 1352. The first and second transceiver 1340, 1344 are configured to receive incoming signals from a remote transmitter and perform analog front-end processing on the signals to generate analog baseband signals. The incoming signal may be further processed by conversion to a digital format, such as by an analog to digital converter, for subsequent processing by the processor 1308. Likewise, the first and second transceiver 1340, 1344 are configured to receive outgoing signals from the processor 1308, or another component of the mobile device 1308, and up convert these signals from baseband to RF frequency for transmission over the respective antenna 1348, 1352. Although shown with a first wireless transceiver 1340 and a second wireless transceiver 1344, it is contemplated that the mobile device 1300 may have only one such system or two or more transceivers. For example, some devices are tri-band or quad-band capable, or have Wi-Fi, Bluetooth®, NFC, or other communication capability.

It is contemplated that the mobile device, and hence the first wireless transceiver 1340 and a second wireless transceiver 1344 may be configured to operate according to any presently existing or future developed wireless standard including, but not limited to, Bluetooth, WI-FI such as IEEE 802.11 a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device is one or more systems connected to the second bus 1312B which also interfaces with the processor 1308. These devices include a global positioning system (GPS) module 1360 with associated antenna 1362. The GPS module 1360 is capable of receiving and processing signals from satellites or other transponders to generate location data regarding the location, direction of travel, and speed of the GPS module 1360. GPS is generally understood in the art and hence not described in detail herein. A gyroscope 1364 connects to the bus 1312B to generate and provide orientation data regarding the orientation of the mobile device 1304. A magnetometer 1368 is provided to provide directional information to the mobile device 1304. An accelerometer 1372 connects to the bus 1312B to provide information or data regarding shocks or forces experienced by the mobile device. In one configuration, the accelerometer 1372 and gyroscope 1364 generate and provide data to the processor 1308 to indicate a movement path and orientation of the mobile device.

One or more cameras (still, video, or both) 1376 are provided to capture image data for storage in the memory 1310 and/or for possible transmission over a wireless or wired link or for viewing at a later time. The one or more cameras 1376 may be configured to detect an image using visible light and/or near-infrared light. The cameras 1376 may also be configured to utilize image intensification, active illumination, or thermal vision to obtain images in dark environments. The processor 1308 may process machine readable code that is stored in a non-transitory state or transitory state on the memory to perform the functions described herein.

A flasher and/or flashlight 1380, such as an LED light, are provided and are processor controllable. The flasher or flashlight 1380 may serve as a strobe or traditional flashlight. The flasher or flashlight 1380 may also be configured to emit near-infrared light. A power management module 1384 interfaces with or monitors the battery 1320 to manage power consumption, control battery charging, and provide supply voltages to the various devices which may require different power requirements.

FIG. 14 is a schematic of a computing or mobile device, or server, such as one of the devices described above, according to one exemplary embodiment. Computing device 1400 is intended to represent various forms of digital computers, such as smartphones, tablets, kiosks, laptops, desktops, workstations, personal digital assistants, servers, blade servers, mainframes, and other appropriate computers. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 1400 includes a processor 1402, memory 1404, a storage device 1406, a high-speed interface or controller 1408 connecting to memory 1404 and high-speed expansion ports 1410, and a low-speed interface or controller 1412 connecting to low-speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high-speed controller 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is one or more volatile memory units. In another implementation, the memory 1404 is a non-volatile memory unit or units. The memory 1404 may also be another form of computer-readable medium, such as a magnetic or optical disk.

The storage device 1406 can provide mass storage for the computing device 1400. In one implementation, the storage device 1406 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high-speed controller 1408 manages bandwidth-intensive operations for the computing device 1400, while the low-speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed bus 1414. The low-speed bus 1414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in several different forms. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a micro-drive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In-Line Memory Module) card interface. Such expansion memory 1474 may provide extra storage space for device 1450 or may also store applications or other information for device 1450. Specifically, expansion memory 1474 may include instructions to carry out or supplement the processes described above and may include secure information also. Thus, for example, expansion memory 1474 may be provide as a security module for device 1450 and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, a GPS (Global Positioning system) receiver module 1470 may provide additional navigation- and location-related wireless data to device 1450, which may be used, as appropriate, by applications running on device 1450.

The device 1450 may also communicate audibly using audio codec 1460, which may receive spoken information from a user and convert it to usable digital information, such as with speech recognition capability from a digital representation of an analog output from the microphone. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by software applications operating on device 1450.

The computing device 1450 may be implemented in several different forms, as shown in the figure. For example, it may be implemented as a cellular telephone 1482. It may also be implemented as part of a smart phone 1480, personal digital assistant, a computer tablet, computer, laptop, smart speakers, television, mechanical arm, or other similar mobile device.

Thus, various implementations of the systems and techniques described here can be realized in digital electronic circuitry, integrated circuitry, especially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium", "machine executable code" or "computer-readable medium" refers to any computer program product, apparatus and/or device (e.g., optical disks, flash drives, magnetic discs, optical disks, memory, Programmable Logic Devices (PLDs)) used to provide machine instructions and/or data to a processor, including a machine-readable medium that receives machine instructions as a machine-readable signal. The term "machine-readable signal" refers to any signal used to provide machine instructions and/or data to a programmable processor. These signals may be non-transitory or transitory.

To provide for interaction with a user, the systems and techniques described here can be implemented on a computer having a display device such as LCD (liquid crystal display) monitor), LED, OLED, for displaying information to the user and a keyboard and a pointing device (e.g., a mouse, joystick, trackball, or similar device) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 1400 and/or 1450) that includes a back end component (e.g., as a data server, slot accounting system, player tracking system, or similar), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include LAN, WAN, and the Internet.

The computing system can include clients and servers. A client and server are generally remote from each other and typically interact through a communication network. The relationship of client and server arises by virtue of computer programs running on the respective computers and having a client-server relationship to each other.

One embodiment of the AI layer is an intelligent SDK ("ISDK") with AI proxy. The ISDK may be prebuilt into an application (such as embedded into the software code of an application), installed into an application at a later point (such as being called by a built-in function or APK of the application), or a separate software module that is on a user device (such as a smartphone, home device, wearable, or any user interaction accepting electronic device), and may be integrated with the user device at multiple points, ranging from above the OS such that applications may communicate over the OS's internal channels, to directly within an application itself such that the ISDK is embedded within the rest of the application code. In one embodiment, the ISDK is responsible for providing the means to the calling application to supply credentials for the purposes of authentication. Furthermore, the ISDK supports concurrent bidirectional streaming communication.

Specifically, the ISDK may support streaming communication by permitting a single service request to receive multiple responses. Likewise, multiple service requests may receive have a single response. This "streaming" can also be considered as a one-to-many or many-to-one style request-response.

In addition, the ISDK may support bidirectional streaming communication so as to not restrict streaming to many-to-one or one-to-many, but rather, many-to-many, such that multiple requests may have multiple responses. For example, a user may make a spoken request in the form of a sentence to an application. Every word in that sentence may be considered a part of an outgoing stream of communication, while an action in response to some subset of these words may be considered a response as part of an incoming stream of communication. Because the ISDK supports bidirectional streaming, this process of outgoing and incoming communication would not stop until both sides (the user and the application) confirm the end of communication.

The ISDK may also support concurrent bidirectional streaming communication, such that multiple bidirectional streaming may occur at the same time. For example, in a system of multiple security cameras, each camera transmits an ongoing video feed to one server. Each frame of each video may be considered one communication. The on-going video feed may be considered a stream of communication. The server's command back to the camera to rotate (such as to track a moving person) may be considered a bidirectional streaming communication. Finally, the server's ability to receive video feeds from multiple cameras, and commanding the movement of such cameras, may be considered concurrent bidirectional streaming communication. The ISDK transparently manages the batching and dispatch between the disparate incoming streams and the potentially mismatched outgoing response streams.

The AI proxy manages the communication between an application (including the application's ISDK) and its back-end server component. In one embodiment, the AI proxy may be embedded within the back-end server. In another embodiment, the AI Proxy may operate as a separate application within the router of an application to intercept incoming and outgoing traffic into the application. The AI proxy may provide services related to logging, metrics, analytics, authentication and rate limiting. The AI proxy may have its own form of artificial intelligence in order to automatically detect where to inject and what to monitor. In this way the AI proxy is a transparent way to add intelligence to an otherwise unintelligent application. Where the AI proxy is not directly integrated with the application's back-end server, the application developer may need to provide hooks for communication. A hook is a method for altering the behavior of an application by intercepting communication. The AI proxy may automatically discover these hooks to facilitate emulation of the tighter connection that would come from direct embedding.

The ISDK, in conjunction with the AI proxy, improves upon the conventional communication method between an application and its back-end server by enabling concurrent bidirectional streaming between the application, the application's back-end server, and cloud-based AI services. This is achieved by the ISDK's ability to maintain application states ("states"), and the AI proxy's ability to process one or more service requests in a hybrid combination of an application's back-end server and cloud-based AI services.

A state is a set of input in the application at an instant in time. Normally, whenever the input changes, then a new state is generated to replace the previous state. Conventional SDK is not capable of maintaining states. The ISDK, in contrast, can maintain states using AI sessions. A session is a group of related service requests which an AI service may understand as one computational unit. In any given session, new service requests may augment previous service requests, such as to undo and modify previous computations as a part of the same session. The ability to hold AI sessions, and thus to maintain states, allows the cloud-based AI services to answer service requests more intelligently. In addition, the AI proxy's own routing observation system may also be automatically augmented by the maintenance of states.

Conventional methods of communication between the application and its back-end server are also not capable of processing service requests using a combination of back-end servers and cloud-based AI services. For example, a conventional SDK typically routes service requests directly to an application's back-end servers. If cloud-based AI services are needed, an API gateway would be required. The AI proxy, on the other hand, eliminates the necessity of API gateways. The AI proxy may run between the application and its back-end server such that a service request may be split, and a portion of the service request may be routed to cloud-based AI services instead. The AI proxy may, itself, be considered an AI layer which works in conjunction with an ISDK running on the application, an AI layer running on a user interacting device, and an aiOS running in the cloud. With this approach, the AI proxy may facilitate co-operation between an application's back-end servers and the various AI services provided by the AI layers and aiOS to ensure proper monitoring, metrics, authentication, and rate measurement is accomplished given the local compute taken place.

Once the application is integrated with its back-end server and cloud-based AI services using the ISKD (within the application running on the user device), the AI proxy, and any additional AI layer or aiOS that may be necessary, then the application is able to build out stateful, hybrid deployment artificial intelligence sessions. The first user-initiated request may instantiate an AI session between the application and its back-end server. Once the session is initiated, data that constitutes the service request is pushed from the application to the back-end server. As the back-end server receives new data, it may take the following steps:
  a) Process the data and tell the application that it should continue sending data, but no response is ready yet;
  b) Respond to the application and:
    i) Indicate that new data may be sent for further responses;
    ii) Indicate that no new data should be sent as part of this current request;
    iii) Indicate that no new data should be sent as part of this current request and that a new session must be started for new requests (terminal session);
  c) Signal to the application that it should stop sending data as no new data would cause a response to be sent back and:
    i) Indicate that a new request may be sent as part of the current session;
    ii) Indicate that a new session must be started for new requests (terminal session).

In this embodiment, the responses are from the back-end server to the application, but in other embodiments, response can travel between an application, it's back-end server, any cloud-based AI service, and any other devices that may be involved in the process. These responses can come in the forms of commands, renderables, or execution plans. A command is an action that the user device should take. Any action that a user might carry out through manual action could be emulated by a command to perform identical execution using AI services. Examples of this could be opening specific applications, performing certain actions within said applications, checking the content of some external application's data. A renderable piece of data is such that the information can be displayed to the user in some form. This might come in the format of an image, text, a card or anything in between. An execution plan is what enables hybrid device computation. The back-end server may send an execution plan such that a piece of computation is executed as procedures on the user device. The application is then indicated to send back the results of said execution plan as a new request within the current session. The execution plan is able to determine, based upon user device capabilities and request requirements, what segmentation may be possible between the application and the back-end server. This enabled monetization methods where partial rate limiting is used such that a request that can be partially carried out on user device (by means of a backend triggered execution plan) may be measured at a lower rate cost than a request where the execution must take place completely on the back-end server.

With the two above concepts, the IDSK and AI proxy embodiment advances over the prior art by allowing for fundamentally new AI applications to be developed. An example of this would be a first-of-its-kind conversational, multi-turn voice assistant.

Figure 15:
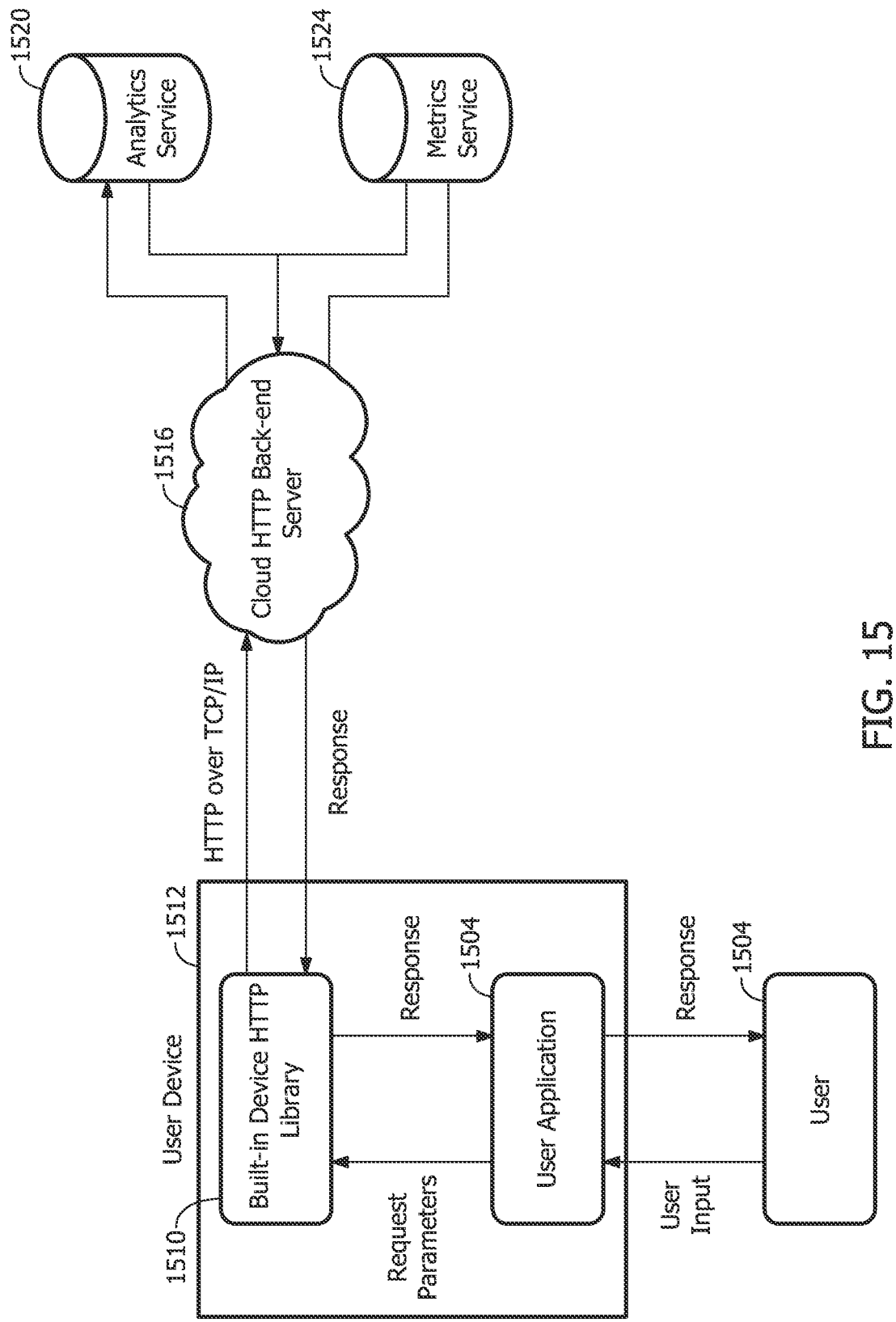
FIG. 15 illustrates the conventional method of interaction between a user application and its back56-end server.

FIG. 15 illustrates the conventional method of interaction between a user application and its back-end server. In FIG. 15, a user application 1508 may be running in a user device 1512. The user application's back-end server 1516 may be stored in a cloud, a stand-alone server, or in any computing environment. The user application 1508 may be in communication with the back-end server 1516, and may have access to analytics services 1520 (to determine the type of user request being sent), and metrics services 1524 (to determine the optimal response to the user request). Thus, a user 1504 provides input to the user application 1512 and the input is converted into request parameters. The HTTP library 1510 built into the user device 1512 may convert the request parameters into HTTP and may transmit the HTTP to the back-end server 1516, which finishes processing the request using analytics services 1520 and metrics services 1524. Upon successful processing, the back-end server 1516 may return a response to the user device 1512, which may route the response back to the user application 1508 for output to the user 1504. This conventional interaction between the user application 1508 and its back-end server 1516 may be limited to non-AI related user or service requests if AI services are not provided by the user application 1508, the built-in device HTTP library 1510, and/or the back-end server 1516.

Figure 16:
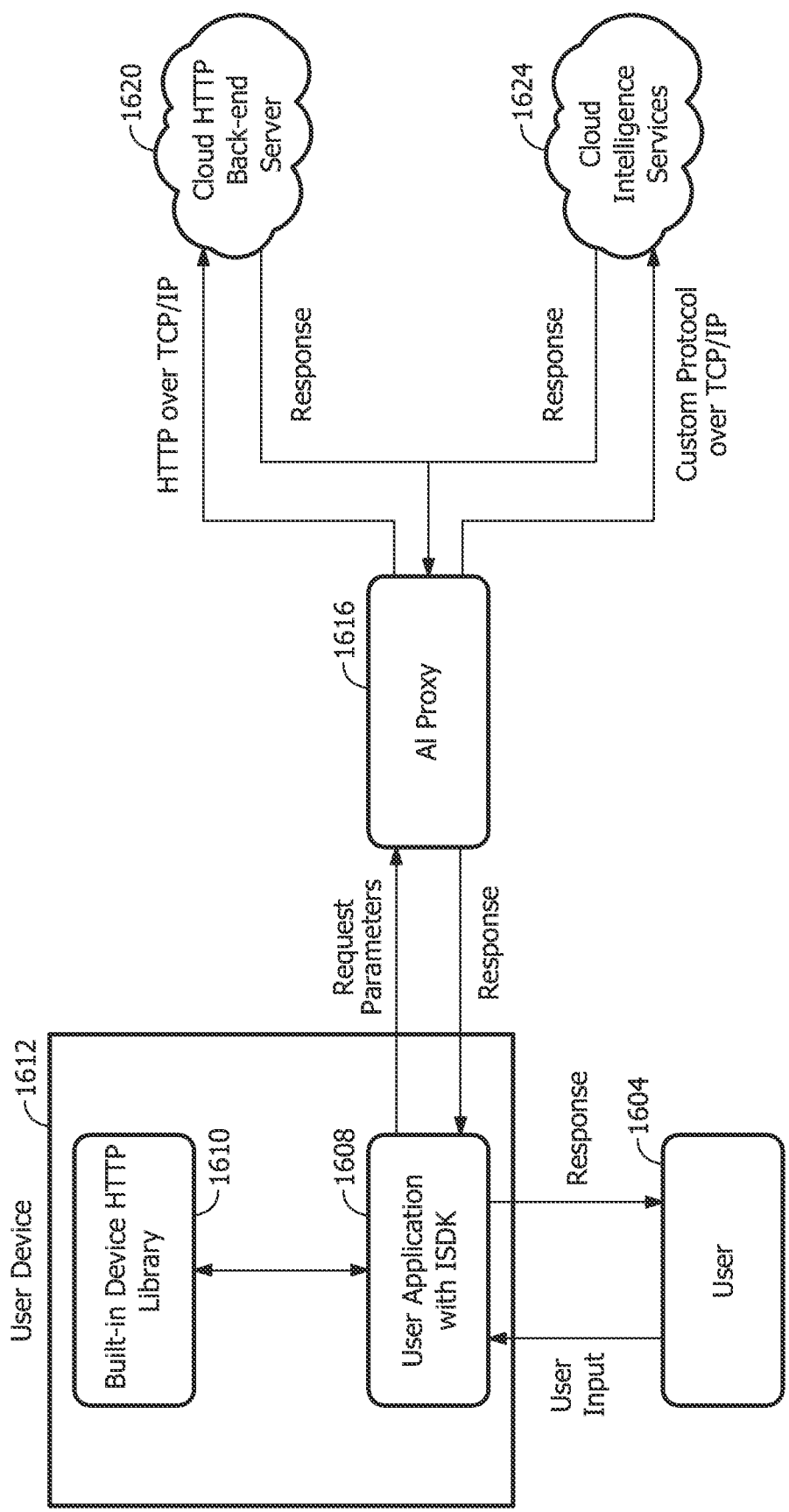
FIG. 16 illustrates the interaction between a user application and its back-end server using an ISDK and AI proxy.

FIG. 16 illustrates the interaction between a user application and its back-end server using an ISDK and AI proxy. An ISDK is installed in the user application 1608, which runs on a user device 1612. The user application 1608 may be supported by and communicate with a back-end server 1620 stored in a cloud. The user application's 1608 communications with its back-end server are intercepted by an AI proxy 1616, which is also in communication with AI services (software modules) 1624 stored in a cloud.

In one embodiment, the IDSK may be installed in the OS of the user device 1612, and the user input may be routed from the user application 1608 to the ISDK, and then to the AI Proxy. The ISDK may also be embedded within a particular application running on the user device to enable AI services for that particular application. In one embodiment, the AI proxy 1616 may also communicate with, and use, the AI services on the user device 1612, the ISDK, an AI layer, or an aiOS operating on the user device, or an AI layer or aiOS.

A user 1604 may input a request to the user application 1608. The ISDK in the user application 1608 may independently convert the user request into request parameters. Where the HTTP library 1610 of the user device 1612 is needed (such as a user request to retrieve a stored phone number to make a phone call), the ISDK may also cooperate with the user device 1612 to generate the request parameters. The ISDK may then send the request parameters to the AI proxy 1616, which determines whether the request parameters comprise a non-AI service request (service requests that do not require AI services to fulfill) that the back-end server 1620 can independently fulfill, in which case the AI proxy 1616 may route the entire service request to the back-end server 1620. The AI proxy 1616 may also determine the request parameters comprise an AI service request that must be fulfilled using AI services, in which case the AI proxy 1616 may route a portion of the service request to the necessary AI services module 1624 in the cloud for further processing. The back-end server 1620 and the AI service modules 1624 may fulfill their respective service requests and return separate responses to the AI proxy 1616. The AI proxy may then combine the responses into a single response to fulfill the request parameters. Though not illustrated in FIG. 16, the responses from the back-end server 1620 and the AI service modules 1624 may be combined at any point of the communication between the back-end server 1620 to the user application 1608. For example, the responses may be combined by the back-end server 1620, the AI service modules 1624, the ISDK, or the user application 1608.

For example, a user from Texas may want to determine the current weather condition in his area. If the user enters a text-based query, such as by entering a zip code, and pressing the "get weather" button on a weather application, then the AI proxy may determine the text-based query can be fulfilled using the weather application's back-end server. The AI proxy may thus route the text-based query to the back-end server. If, on the other hand, the user enters a voice command, such as "what is the weather here", then the AI proxy may determine that AI services such as speech recognition is needed. Then the AI proxy may route an audio file of the voice command to an AI service for speech recognition. The AI proxy may also request GPS information from the user device to identify the user's zip code. The AI proxy may then transmit the text-based query (converted from the audio user input) and the identified zip code to the back-end application to retrieve the weather condition.

In addition, upon outputting the weather response to the user, the user may enter a follow-up voice command, such as "what about New York". The ISDK in the weather application may maintain the previous conversation state of identifying and retrieving the weather for Texas, and recognize the user wishes to retrieve the weather for New York (without the user entering a full voice command such as "what is the weather in New York"). The ISDK and the AI proxy may then continue the request-response process until the end of the conversation state.

Figure 17A:
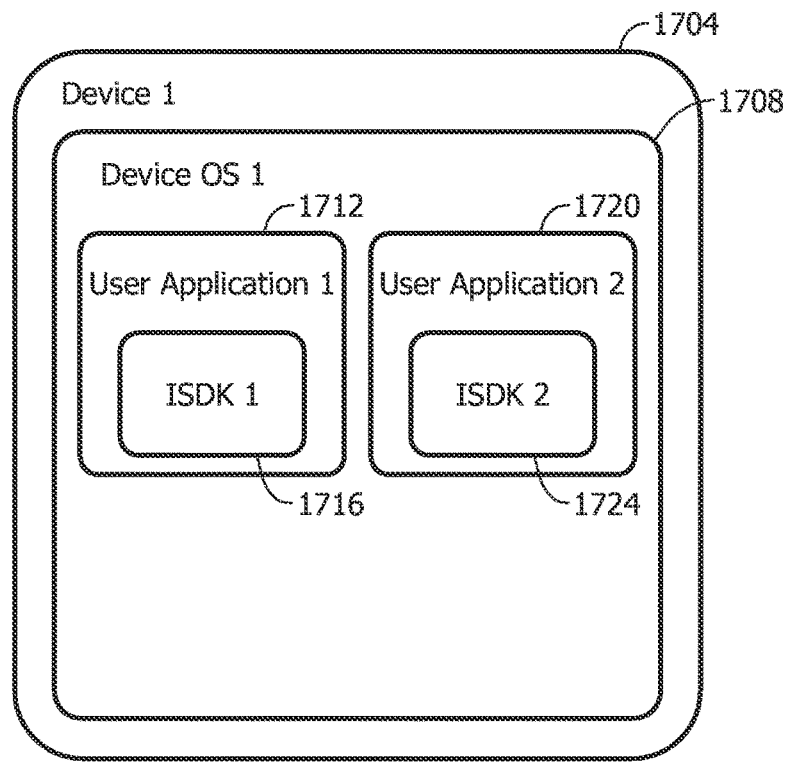
FIG. 17A illustrates an embodiment of a user device having separate ISDKs installed in individual user applications.

FIG. 17A illustrates an embodiment of a user device having separate ISDKs installed in individual user applications. In FIG. 17A, a first device 1704 operates on a first OS 1708. A first user application 1712 is installed on the first OS 1708. A first ISDK 1716 is installed or embedded in the first user application 1712. A second user application 1720 is also installed on the first OS 1708. A second ISDK 1724 is installed or embedded in the second user application 1720. The first and second ISDK 1716, 1724 may be customized to serve their respective user applications 1712, 1720.

Figure 17B:
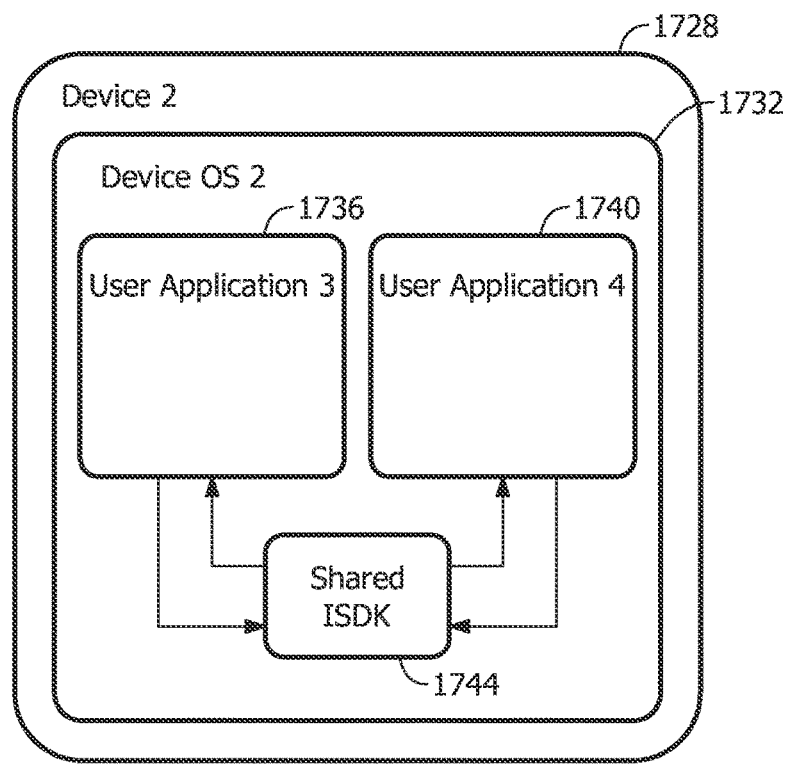
FIG. 17B illustrates an embodiment of a user device having multiple user applications share a single ISDK installed on the user device.

FIG. 17B illustrates an embodiment of a user device having multiple user applications share a single ISDK installed on the user device. In FIG. 17B, a second device 1728 operates on a second OS 1732. A third user application 1736 and a fourth user application 1740 are installed on the second OS 1732. No individual or customized ISDK is installed or embedded in the third and fourth user applications 1736, 1740. Rather, a shared ISDK is also installed in the OS, which both the third and fourth user application 1736, 1740 may access and use.

FIGS. 17A and 17B are two exemplary embodiments of the placement of ISDK relative to user applications and the user device OS. In other embodiments, any combination of ISDKs in the user application, and ISDKs in the OS may work independently or in cooperation with other ISDKs to facilitate AI services.

Figure 18:
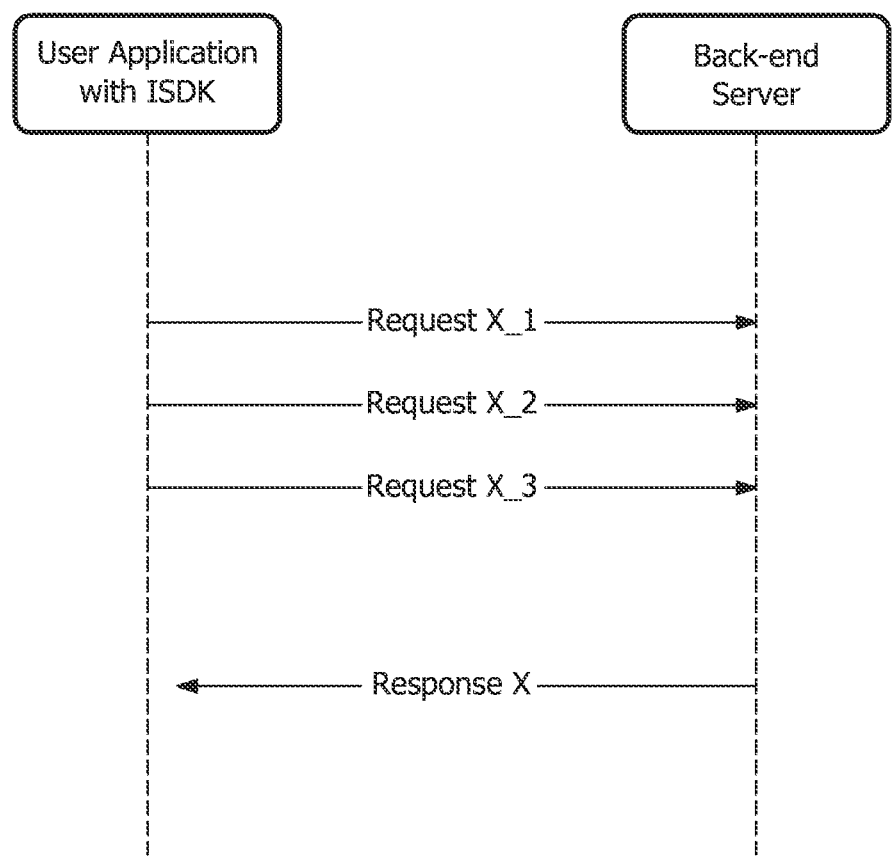
FIG. 18 provides an example of the many-to-one request-response style using a single-direction streaming communication.

As discussed above, the ISDK and the AI proxy may permit a user application to perform streaming communication with its back-end server. Streaming can be considered as a one-to-many or many-to-one style request-response. FIG. 18 provides an example of the many-to-one request-response style using a single-direction streaming communication from a user application to the back-end server using an ISDK and the AI proxy. In FIG. 18, the user application may use an ISDK to generate a first request X_1, a second request X_2, and a third request X_3. The three requests X_1 to X_3 are sent to the back-end server using an AI proxy. At the third request X_3, the backend server may send a response X back to the user application's ISDK using the AI proxy.

For example, the user application may be a security camera application that sends the video feed to the back-end server for processing and storage. In its default mode, the user application may control the camera to remain static and only record one frame per second. Requests X_1 to X_3 may be recorded frames, where the first and second frame may be the recorded environment with no movement. At the third frame, an object may be detected in the environment. Upon analysis of the object, the back-end server may identify the object as a person, and may, through response X, direct the security camera application to control the camera to track the person's movement, and to begin recording one frame per 0.1 second. Other applications are possible, such as the multiple requests being from the user the which result in a single response.

Figure 19:
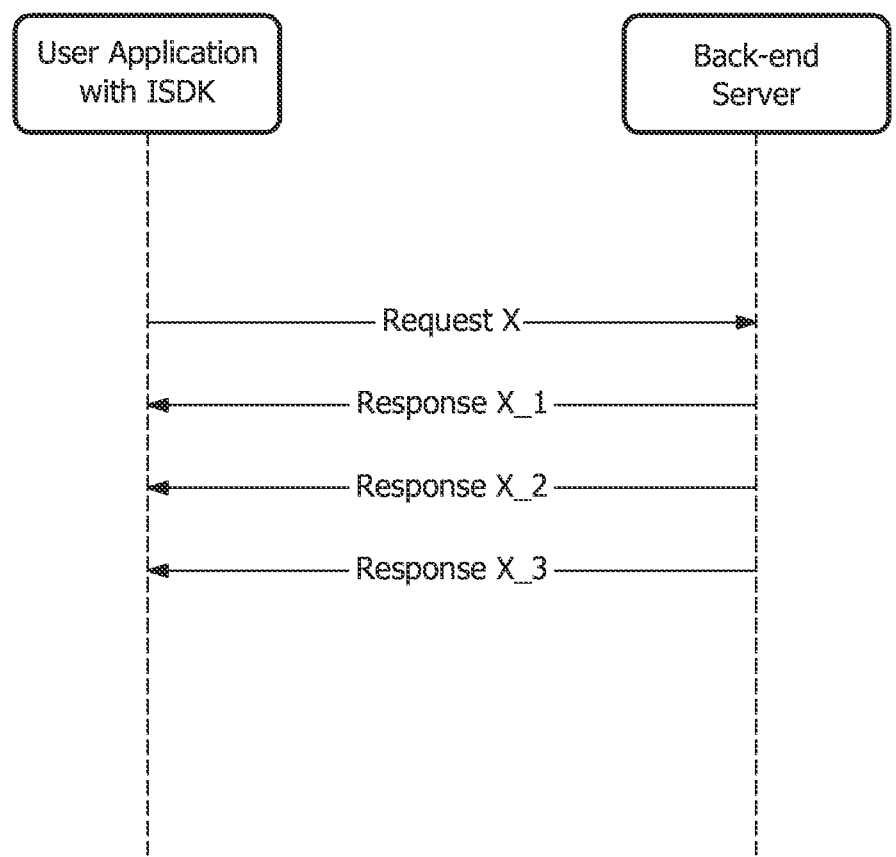
FIG. 19 provides an example of the one-to-many request-response style using a single-direction streaming communication.

FIG. 19 provides an example of the one-to-many request-response style using a single-direction streaming communication from a user application to the back-end server an ISDK and the AI proxy. In FIG. 19, the user application may generate a request X using an ISDK. The request X is sent to the back-end server through an AI proxy, and the back-end server may send a first response X_1, a second response X_2, and a third response X_3 back to the user application's ISDK using the AI proxy.

For example, the user application may be an image display application on a smartphone. Request X may represent the image display application's request to retrieve a panorama picture stored in the back-end server. Because the smartphone may not have a large enough display screen to display the panorama picture all at once, the back-end server may send a top portion of the image in a first response X_1. Upon the user scrolling down, the back-end server may then send a middle portion of the image in a second response X_2. Upon the user scrolling to the bottom, the back-end server may send the bottom portion of the image in a third response X_3.

Figure 20:
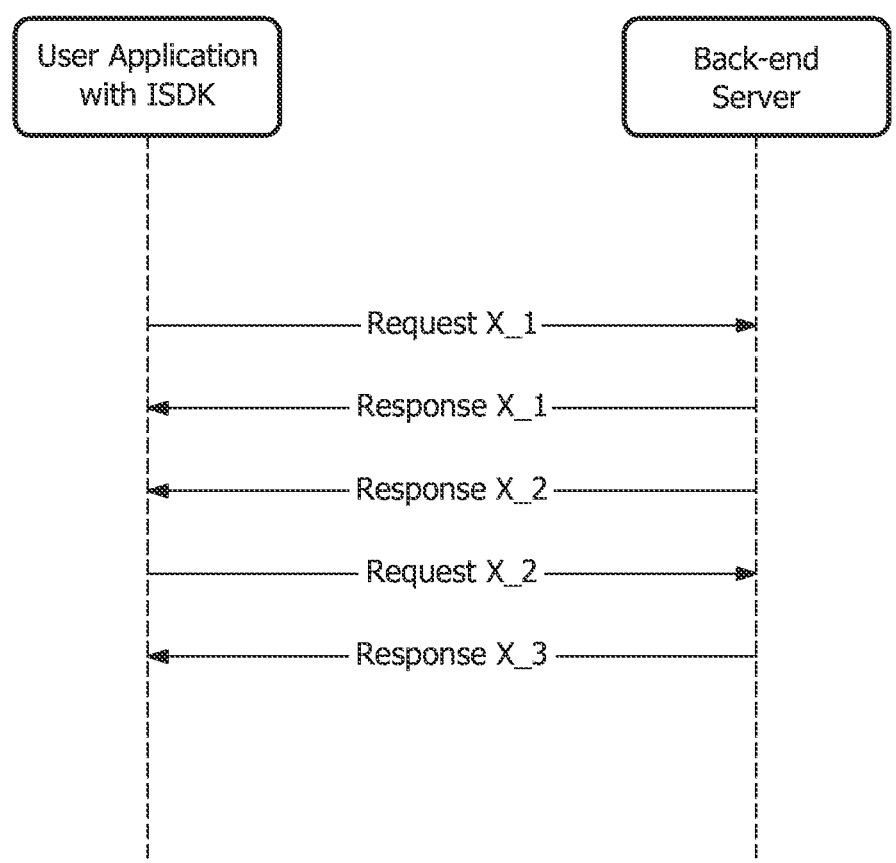
FIG. 20 illustrates the bidirectional streaming communication between a user application and its back-end server using an ISDK and the AI proxy.

As discussed above, the streaming communication via the ISDK and the AI proxy may be bidirectional (also referred to as many-to-many style response-request). FIG. 20 illustrates the bidirectional streaming communication between a user application and its back-end server using an ISDK and the AI proxy. In FIG. 20, using the streaming method discussed above, a first request X_1 may prompt a first response X_1 and a second response X_2. Then a second request X_2 may prompt a third response X_3.

For example, a user may activate a security camera feed using the first request X. The back-end server may respond by sending two frames through the first response X_1 and the second response X_2. The user may request the camera feed to zoom in on an object through the second request X_2. The back-end server may respond by sending an enlarged frame of the desired portion of the camera feed through the third response X_3.

Figure 21:
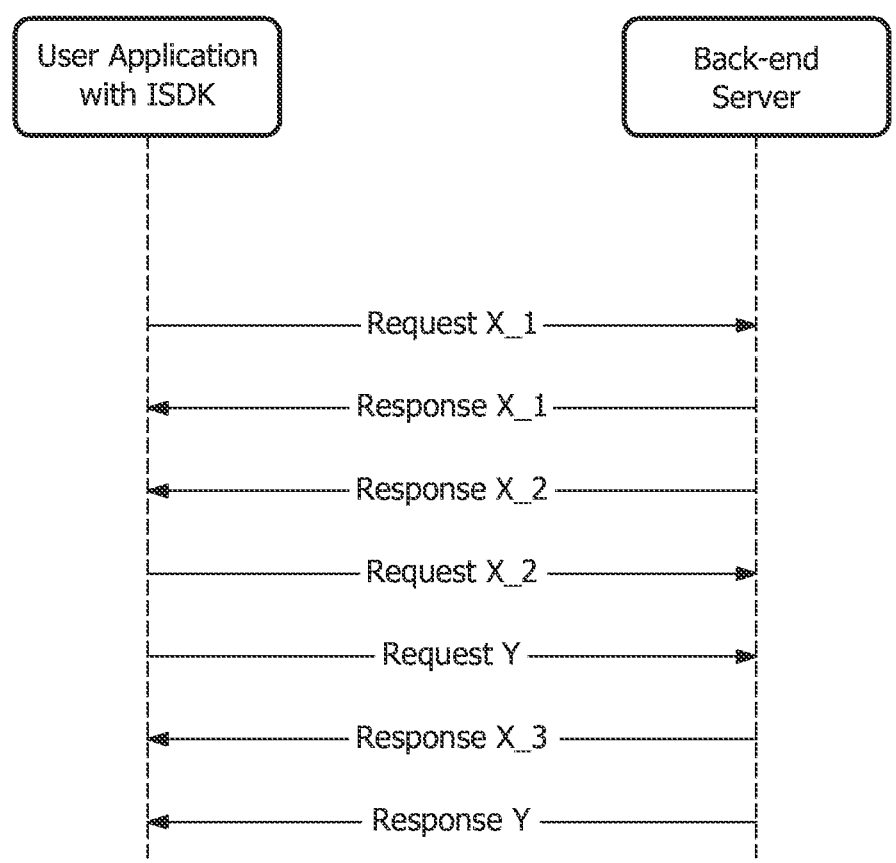
FIG. 21 illustrates the concurrent bidirectional streaming communication between a user application and its back-end server using an ISDK and the AI proxy.

As discussed above, the bidirectional streaming communication via the ISDK and the AI proxy may be concurrent. FIG. 21 illustrates the concurrent bidirectional streaming communication between a user application and its back-end server using an ISDK and the AI proxy. In FIG. 21, during the communication illustrated in FIG. 20, a separate request Y may be made, prompting a response Y. The communication related to Y may be separate from the communication related to X.

Using the example discussed in FIG. 20, the user may, in addition to requesting a zoomed-in feed of the first security camera, also request the security feed of a second security camera through request Y. Thus, in addition to response X_3, the back-end server may also send a frame from the second security camera in response Y. The communication is concurrent because the user may make a request for a zoomed-in feed of the first security camera and a video feed of the second security camera at the same time, and the back-end server may send frames from the first security camera and the second security camera at the same time (for example, the two video feeds may be displayed simultaneously on a split screen display).

Figure 22:
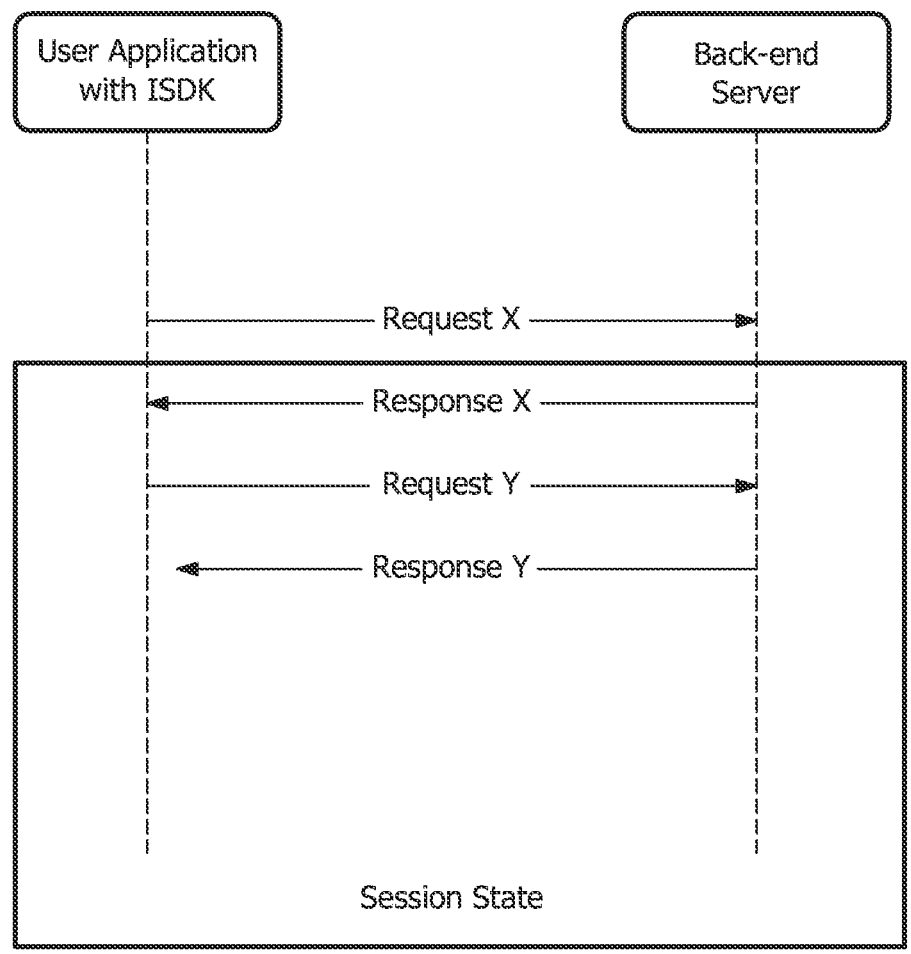
FIG. 22 illustrates how an ISDK may maintain states using AI sessions.

FIG. 22 illustrates how an ISDK may maintain states using AI sessions. In FIG. 22, using the streaming method discussed above, a request X may prompt a response X. Subsequently, a request Y may prompt a response Y. A state may begin at the beginning of response X, and the ISDK may recognize that request Y and response Y may belong to the same state.

For example, request X may be a voice command to "find playlist X", and response X may be the output for playlist X. Request Y may be a voice command to "play the third song". Using conventional methods, the voice command to "play the third song" may return an error because conventional SDKs would not retain memory of the playlist X. But by maintaining the state from response X (such as by saving playlist X), an appropriate response Y may be generated because the ISDK may recognize that a "third song" from the same state means the third song from playlist X. A similar example may be provided for questions regarding the weather in a certain location, and then questions about movies, and then additional questions regarding the certain location. By maintaining states, conversational interaction is improved.

FIGS. 19-22 are examples of possible communications between the user application and its back-end server. As discussed above, concurrent bidirectional streaming communication with conversation states may permit any number of communications and any number of conversation states to occur. Each communication may involve any number of requests and responses, and any number and combination of these requests and response may make up a conversation state.

Figure 23:
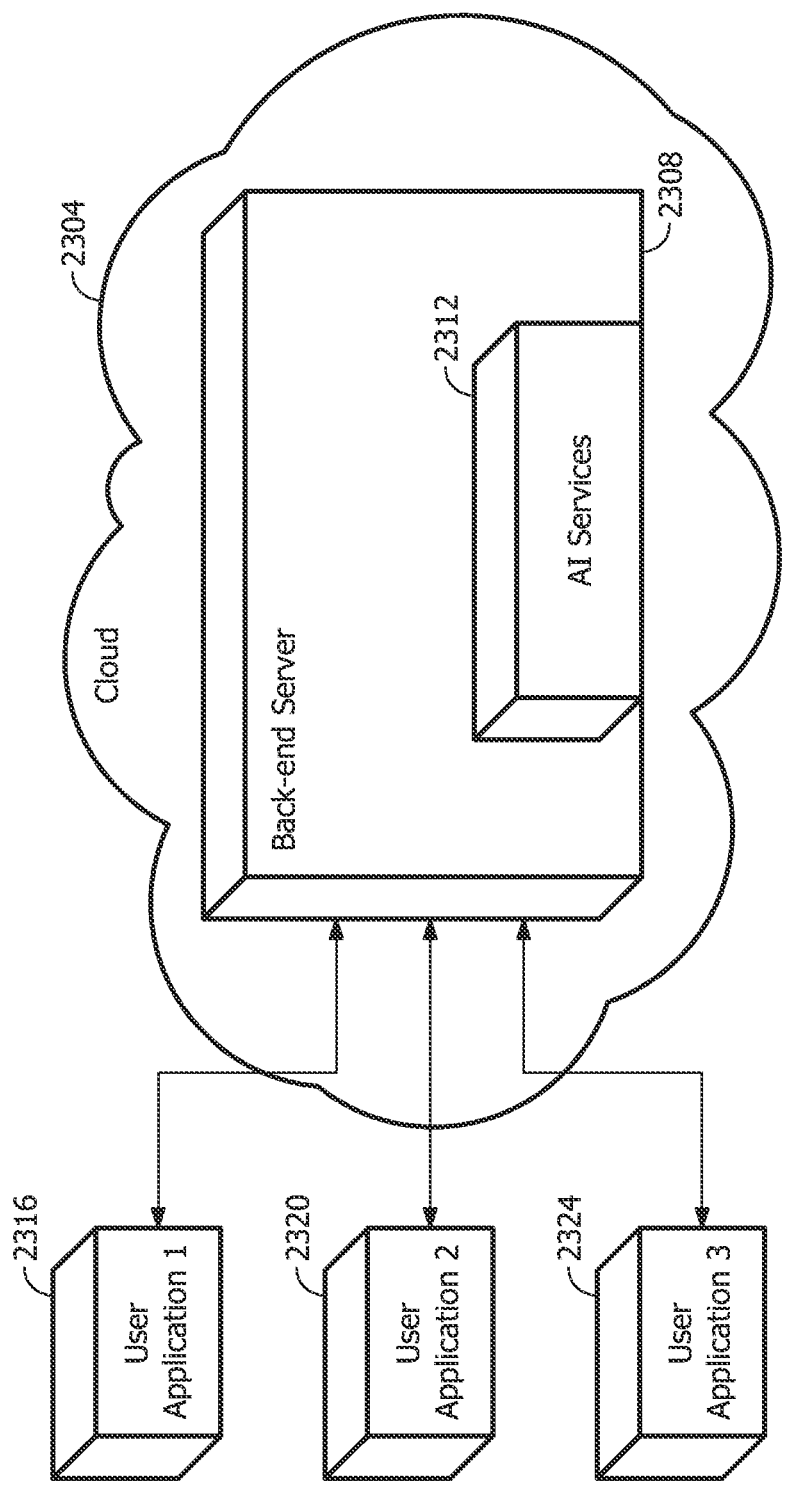
FIG. 23 illustrates one possible location of AI services.

As discussed above, conventional methods of communication only permit service requests from user applications to be routed directly and entirely to a back-end server, or to an API gateway for AI services, but not both. An AI proxy improves upon the conventional method by splitting service requests and, where needed, routing a portion of the service request to AI services. FIG. 23 illustrates an embodiment having AI services embedded in the back-end server and thus, no AI proxy is needed. In FIG. 23, a back-end server 2308 may be stored in a cloud or a cloud-based remote server 2304. AI-services 2312 may be embedded in the back-end server 2308. Various user applications 2316, 2320, 2324 may be installed on one or more user devices. These user applications 2316, 2320, 2324 may have built-in ISDKs, or access an ISDK operating on the OS of the one or more user devices. The user applications 2316, 2320, 2324 may all access the back-end server 2308.

In this embodiment, the embedded AI services 2312 become a part of the back-end server 2308 server. Upon receiving service requests from the user applications 2316, 2320, 2324 to the back-end server 2308, the back-end server 2308 may then access the AI services 2312 as needed to fulfill the service request.

For example, the user applications 2316, 2320, 2324 may be weather applications installed on various user devices. The back-end server 2308 may originally not have any AI services embedded and may serve basic weather application functions such as retrieving weather condition based on input of zip code. Thus, user input to the user applications 2316, 2320, 2324 may be limited to text-based input such as entering zip codes. However, using embedded AI services 2312 (such as for example with an embedded ISDK), such as a speech recognition service, the back-end server 2308 may then process user input in audio format such as voice commands and be able to maintain states to have conversations regarding the weather that include temperature, wind, and rainfall, without having to create complete and independent requests which repeat the location and date with every request.

FIG. 23 illustrates one possible location of AI services. It is contemplated that AI services may be located anywhere where an ISDK, an AI layer, or an aiOS operates or is able to access. An AI proxy may also be inserted between any communication among user applications using ISDKs and the user application's back-end servers, even when such back-end servers may already have built-in AI services.

Figure 24:
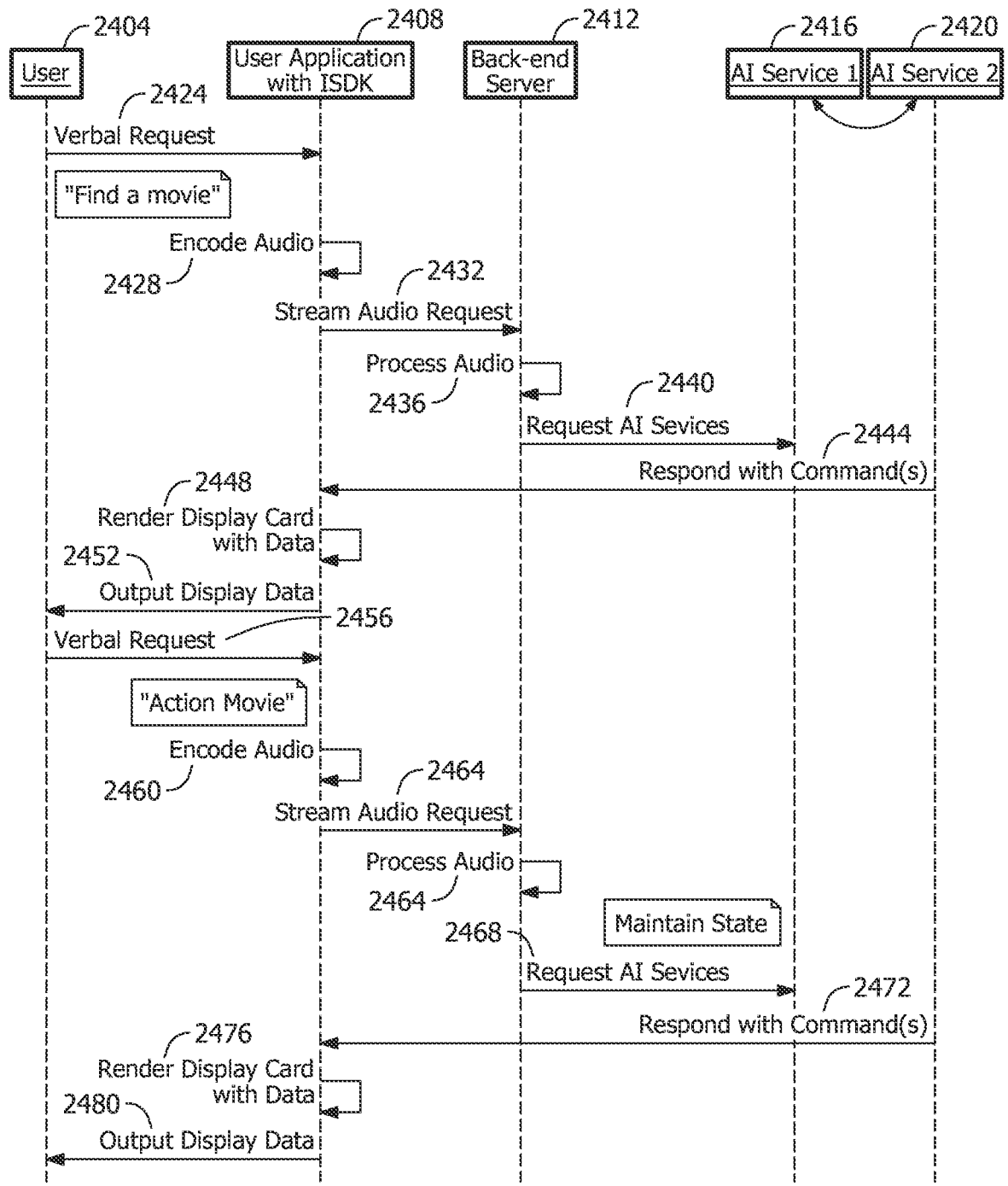
FIG. 24 provides an example of how AI services embedded in back-end servers may process user requests.

FIG. 24 provides an example of how AI services embedded in back-end servers may process user requests. In FIG. 24, a user 2404 interacts with a user application with an ISDK 2408. The ISDK may be a part of the user application 2408, or a part of the user device the user application is running on. The user application 2408 may be in communication with a back-end server 2412. The back-end server may have built-in AI services 2416, 2420.

The lifecycle of a user request begins at a step 2424, when the user enters an input to a user application with ISDK. In this case, the user input may be a verbal request of "Find a movie" to a video player application. At a step 2428, the input is encoded into an audio request. Encoding may be performed by the user application, the ISDK, or the user device. At a step 2432, the ISDK may facilitate the concurrent bidirectional streaming of the audio request to the back-end server. In this case, the back-end server may be a movie database.

At a step 2436, the back-end server may process the audio request into a service request. In its original state, the movie database may not have audio-processing capabilities. However, with built-in AI services such as automatic speech recognition (ASR) or natural language understanding (NLU) modules, the movie database may then process the audio request. Thus, the step of processing the audio request 2436 may include an additional step 2440, where the back-end server requests AI services from the built-in AI service modules, and a step 2444, where the AI service modules may execute the AI services requested and return a service request to the back-end server, and the back-end server executes the service request and responds to the user application with a command. In this case, the returned service request may be a command to retrieve a movie from the movie database, and the command may be to render the display card with data for the movie.

At a step 2448, the user application may execute the command. At a step 2452, the user application may present a responsive output to the user. In this case, the user application executes the command by rendering the display card with movie data. The responsive output is the display card for the movie data.

In a multi-turn conversation, the user may provide a follow up input, and thus initiate a second iteration of the process 2452-2480. In the example illustrated in FIG. 24, the user inputs a voice command "action movie". Much of the second iteration 2452-2480 is the same as the first iteration 2424-2452. However, because the ISDK maintains AI sessions, at step 2468, where the back-end server requests AI services from the built-in AI service modules again, the state of the previous request is maintained. Thus, the AI services may interpret the second voice command "action movie" in the context of the first voice command "find a movie". Thus, in step 2468, the AI service modules may execute the AI services requested and return a service request to the back-end server to retrieve an action movie from the movie database for output to the user.

Figure 25:
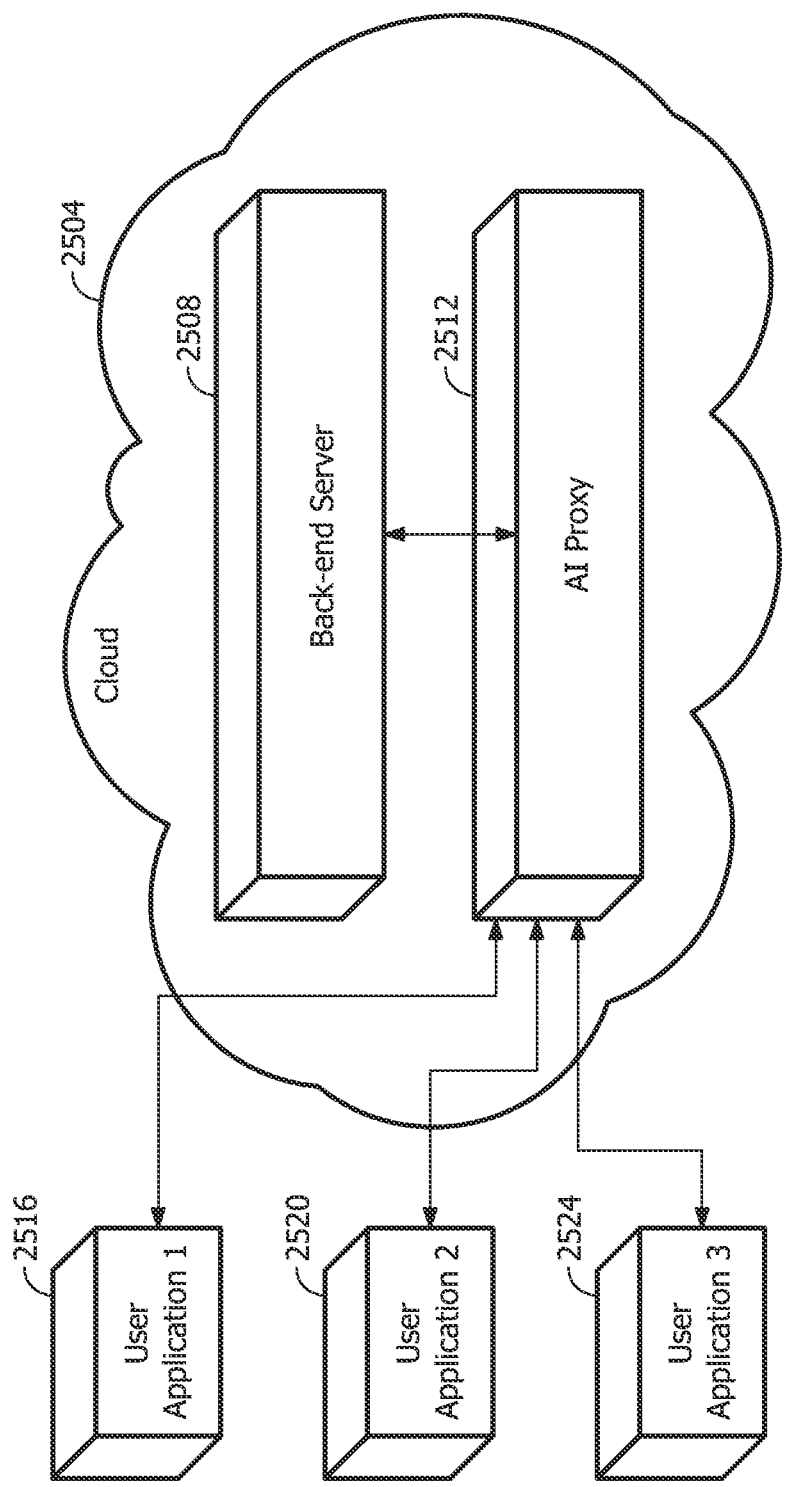
FIG. 25 illustrates one embodiment where AI services may be placed in a separate location as the back-end server.

FIG. 25 illustrates one embodiment where AI services may be in a separate location as the back-end server and thus, an AI proxy is needed to route communication from the user application. In FIG. 25, a back-end server 2508 may be stored in a cloud or a cloud-based remote server 2504. An AI proxy 2512 may be installed in front of the back-end server 2508 to intercept communication to and from the back-end server 2508. Various user applications 2516, 2520, 2524 may be installed on one or more user devices. These user applications 2516, 2520, 2524 may have built-in ISDKs, or access an ISDK operating on the OS of the one or more user devices. The user applications 2516, 2520, 2524 may all access the back-end server 2508, but their requests may first be routed to the AI proxy 2512.

Upon receiving a request from the user applications 2516, 2520, 2524, the AI proxy 2512 may determine whether AI services are needed to complete the request. If no AI services are needed, and the back-end server 2508 is capable of fulfilling the request, then the AI proxy 2512 may route the entire request to the back-end server 2508. Upon fulfilling the request, the back-end server 2508 may send its response back to the user applications 2516, 2520, 2524. Here too, the AI proxy 2512 may intercept the response. For example, the user applications 2516, 2520, 2524 may be weather applications installed on various user devices. The back-end server 2508 provides basic weather application functions such as retrieving weather condition based on input of zip code. Thus, text-based user input to the user applications 2516, 2520, 2524 such as zip codes may be entirely routed to the back-end server 2508.

On the other hand, the user may wish to use voice commands instead of text-based input, such as "what is the weather here today?". Thus, additional AI services, such as speech recognition, may be needed to process the user's voice commands. Though not shown on FIG. 25, if the AI proxy 2512 determines that additional AI services are needed, then the AI proxy 2512 may split the request and route a portion of the request to AI services, which may be stored in another cloud or cloud-based remote server, and another portion of the request to the back-end server 2508. In this example, the AI proxy 2512 may route a processed audio file of the user's voice command to the AI services, which may provide the following services: (1) interpreting the audio file into a command to search for the weather, (2) identifying "here" as the user's location, and converting GPS data into a zip code, and (3) identifying "today" as the current date. The AI proxy 2512 may then route the interpreted information to the back-end server 2508, which may then retrieve the weather based on the zip code and current date provided. Because the ISDK and the AI proxy may, in conjunction, facilitate concurrent bidirectional streaming communication, the process of splitting and routing requests may occur in any possible order, such as discussed in FIGS. 18-22.

In reference to FIG. 25, it is contemplated that AI proxies may be located anywhere where an ISDK, an AI layer, or an aiOS may operate or access.

Figure 26:
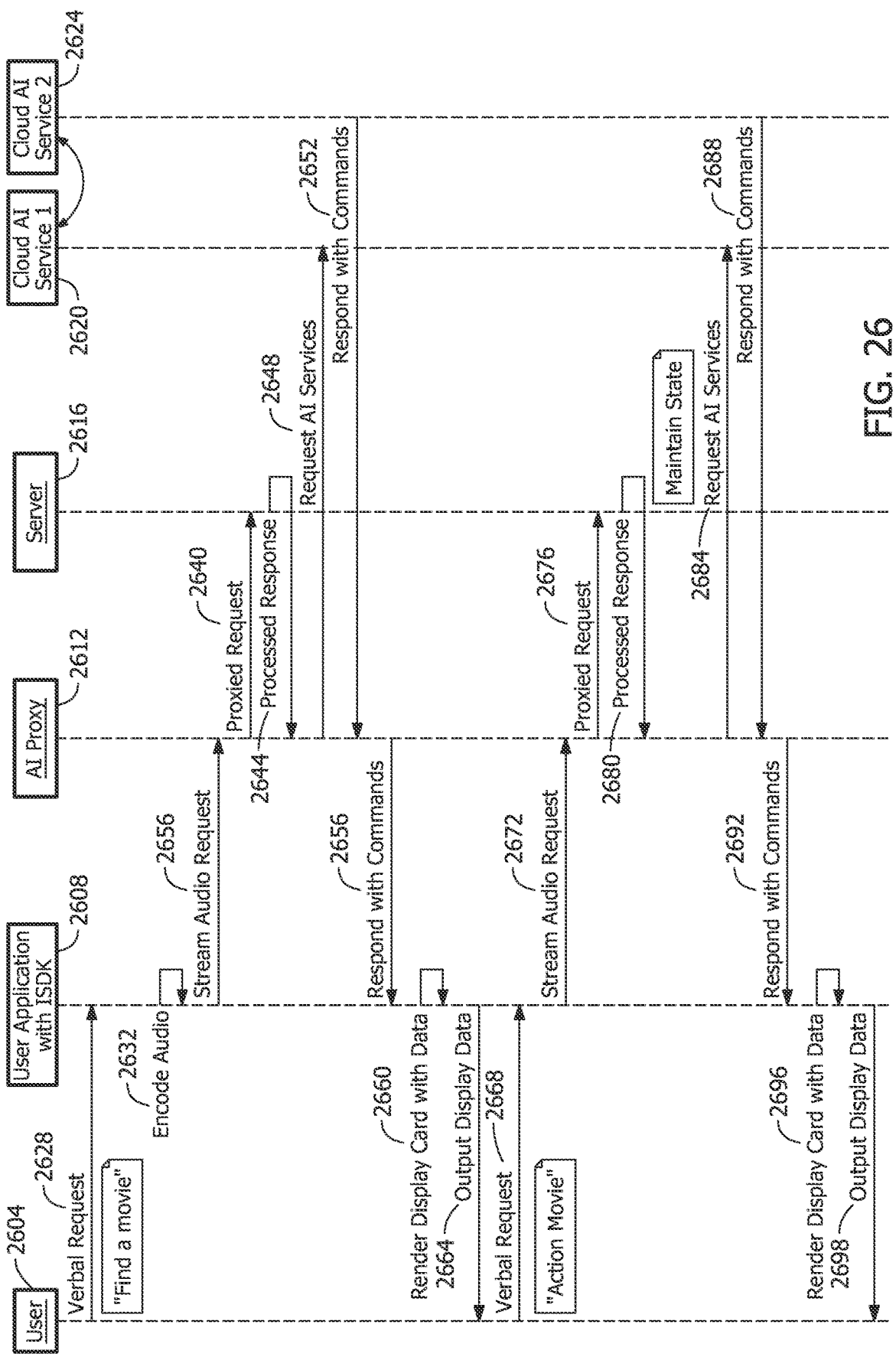
FIG. 26 provides an example of an AI proxy routing user requests to AI services and a back-end server, where AI services are not embedded in the back-end server.

FIG. 26 provides an example of an AI proxy routing user requests to AI services and a back-end server, where AI services are not embedded in the back-end server. In FIG. 26, a user 2604 interacts with a user application having or communicating with an ISDK 2608. The ISDK may be a part of the user application 2608, or a part of the user device the user application is running on. An AI proxy 2612 intercepts communication between the user application 2608 and its back-end server 2616. The AI proxy may separately access AI services 2620, 2624, which may be stored in a separate cloud environment or remote database. In this example, the back-end server 2616 may have limited built-in AI services, or no built-in AI services. The back-end server 2616 may thus rely on external AI services 2620, 2624 to perform AI-related functions.

The lifecycle of a user request begins at a step 2628, when the user enters an input to a user application with ISDK. In this case, the user input may be a verbal request of "Find a movie" to a video player application. At a step 2632, the input is encoded into an audio request. Encoding may be performed by the user application, the ISDK, or the user device. At a step 2636, the ISDK may attempt concurrent bidirectional streaming of the audio request to the back-end server. In this case, the back-end server may be a movie database. The AI proxy may intercept the audio request and identify the need for AI services to fulfill the request. For example, the movie database may not have audio-processing capabilities. Thus, the AI proxy may identify that a portion of the audio request should be routed to external AI services such as automatic speech recognition (ASR) or natural language understanding (NLU) modules. Thus, at a step 2640, the AI proxy may route a first proxied request to the back-end server. At a step 2644, the back-end server may return a response such as to render a display card with data from a movie. Simultaneous, at a step 2648, the AI proxy may route a second proxied request for external AI services. At a step 2652, AI services modules may fulfill the second proxied request and return a response, such as a command to retrieve a movie from the movie database. Because the AI proxy intercepts all communication between the back-end server and the user application, the AI proxy may gather the responses from steps 2644 and 2652 and process and route the responses to the user application, or both. In this case, the combined response may be a command to render the display card with data for a movie from the database.

Because the ISDK and the AI proxy may, in conjunction, facilitate concurrent bidirectional streaming communication, the process of splitting and routing requests, such as described in steps 2640-2656, may occur in any possible order, such as discussed in FIGS. 18-22.

At a step 2664, the user application may execute the command. At a step 2660, the user application may present a responsive output to the user. In this case, the user application executes the command by rendering the display card with movie data. The responsive output is the display data (such as the display card of the movie on a display device).

In a multi-turn conversation, the user may provide a follow up input and thus initiate a second iteration of the process 2668-2698. In the example illustrated in FIG. 26, the user inputs a voice command "action movie". Much of the second iteration 2668-2698 is the same as the first iteration 2628-2664. However, because the ISDK maintains AI sessions, at step 2684, where the back-end server requests AI services from external AI service modules again, the state of the previous request is maintained. Thus, the AI services may interpret the second voice command "action movie" in the context of the first voice command "find a movie". Thus, in step 2688, the AI service modules may execute the AI services requested and return a service request to the back-end server to retrieve an action movie from the movie database for output to the user.

Figure 27A:
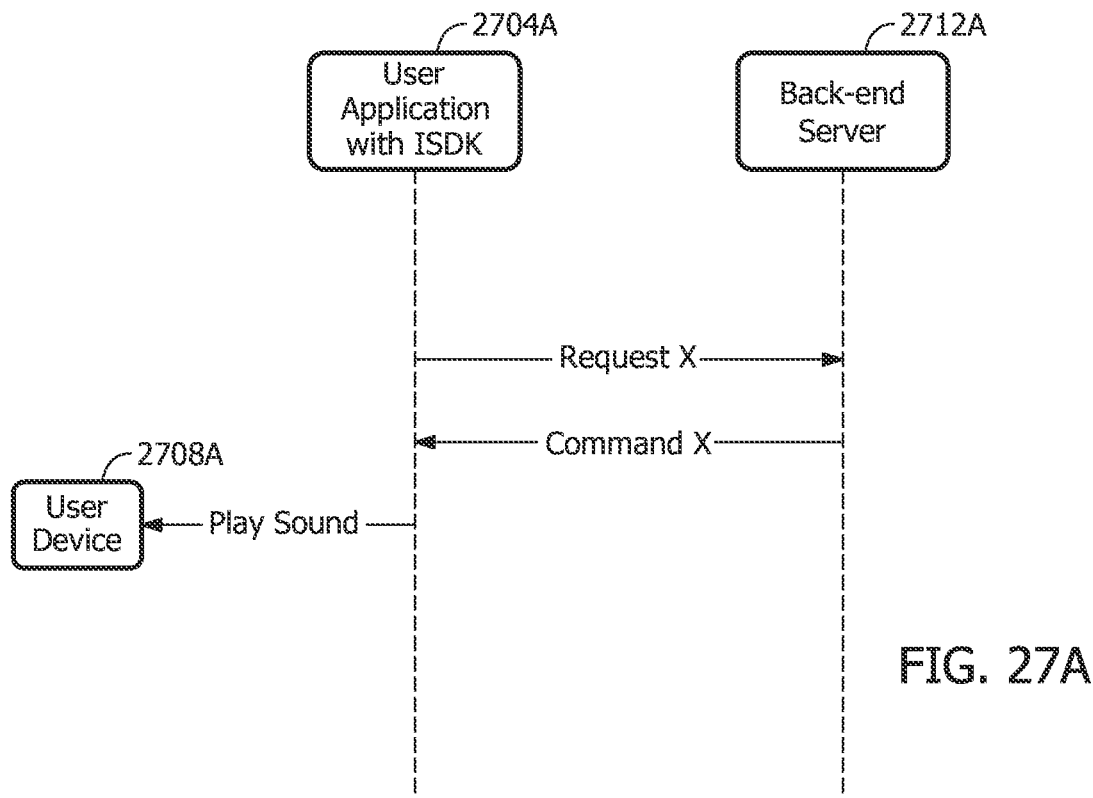
FIG. 27A is a first exemplary communication processes between a user application, its back-end server, and the user application's execution and responsive outputs.
Figure 27B:
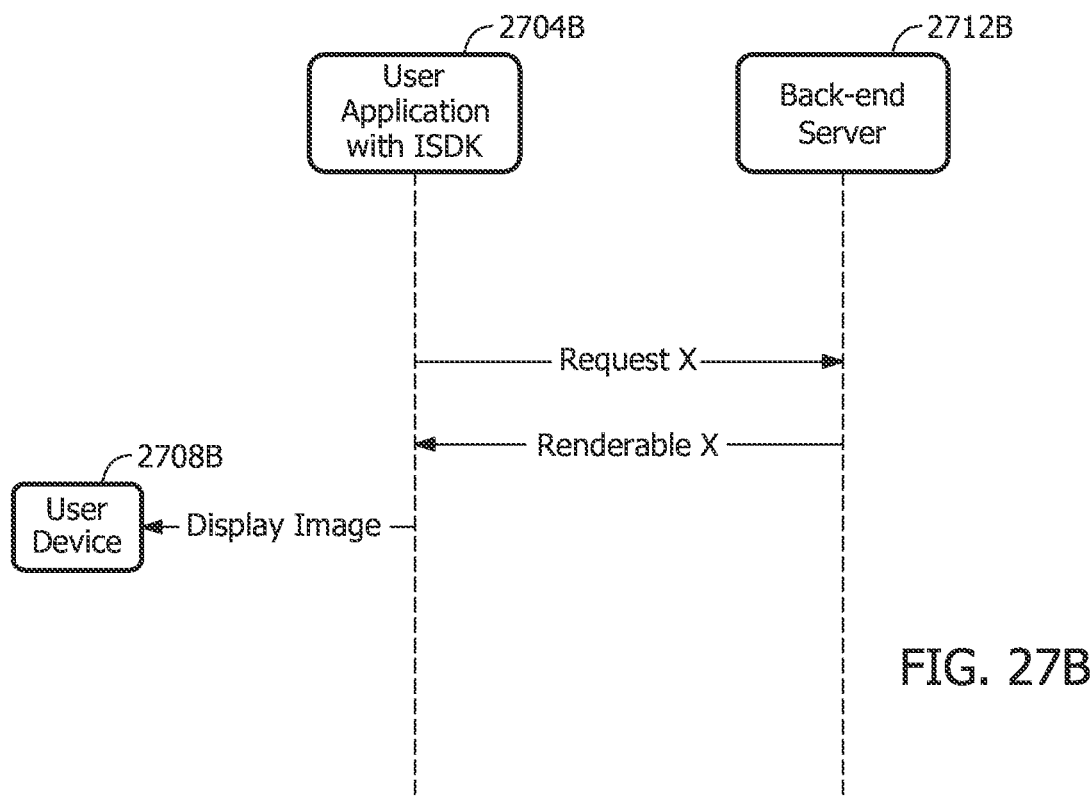
FIG. 27B is a second exemplary communication processes between a user application, its back-end server, and the user application's execution and responsive outputs.
Figure 27C:
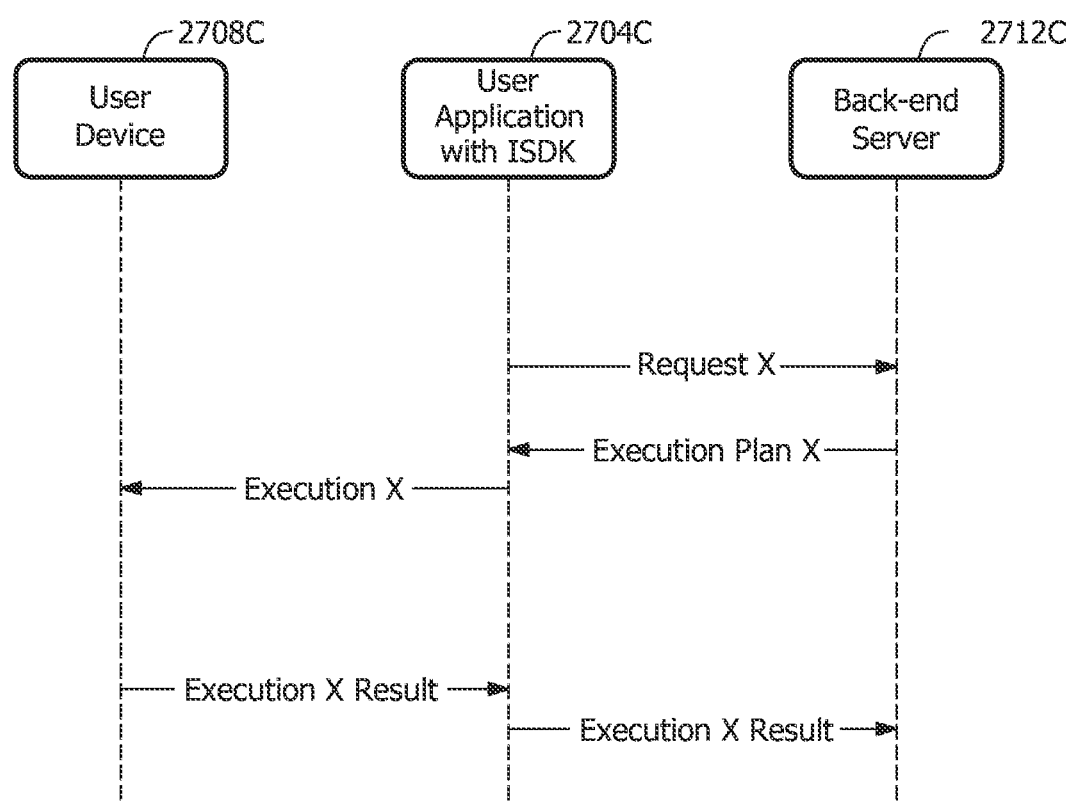
FIG. 27C is a third exemplary communication processes between a user application, its back-end server, and the user application's execution and responsive outputs.

FIGS. 27A, 27B, 27C are exemplary communication processes between a user application, its back-end server, and the user application's execution and responsive outputs. In FIGS. 27A, 27B, 27C, a user application 2704 with ISDK may run on a user device 2708 and access a back-end server 2712. The ISDK may be a part of the user application 2704, or a part of the user device 2708 the user application is running on. An AI proxy may intercept the communication between the user application 2704 and the back-end server 2712.

A request is made from the user application 2704 to the back-end server 2712. The request may be responsive to a user input that a user made to the user device 2708. The request may prompt a response from the back-end server 2712. The user application 2704 may process the response and cause the user device 2708 to produce an output responsive to the user input.

In FIG. 27A, the request may be a service request to play an audio file, such as a song. The response may be a command to compile an audio output device, such as a speaker, with sound data. The responsive output may be the song played from the speaker of the user device 2708.

In FIG. 27B, the request may be a service request to display an image, such as a photo. The response may be a command to compile an image display device, such as a display screen, with renderable image data. The responsive output may be the photo displayed on the screen of the user device 2708.

In FIG. 27C, the request may be a request for information, such as a service request responsive to a user voice command "what alarm do I have set for tomorrow". The response may be an execution plan to retrieve the alarms stored in the user device 2708. Thus, the user device 2708 may return a result responsive to the execution plan back to the user application 2704. The user application 2704 may route that result to the back-end server 2708 for further processing, such as returning a command for an output to the user listing the retrieved alarms.

FIGS. 27A, 27B, 27C are meant to be exemplary only, and are not meant to limit the possible interactions between a user device, a user application, and a back-end server using an ISDK and an AI proxy. Because the ISDK and the AI proxy may, in conjunction, facilitate concurrent bidirectional streaming communication, the process of sending requests, responses, and causing responsive output may occur in any possible order and combination. Back-end server responses may also cause the user device to respond in a variety of other ways such as playing videos, making online purchases, performing searches, retrieving information, storing information, modifying information, etc.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for providing artificial intelligence services comprising:
   receiving a first unfulfilled service request from a user interaction application executing on a user device, the user interaction application running in a first type of operating system;
   generating, from the first unfulfilled service request, an unfulfilled artificial intelligence service request and an unfulfilled non-artificial intelligence service request, wherein the unfulfilled artificial intelligence service request is for language understanding to process speech of the user into a text command that can be processed by the user interaction application, and the unfulfilled non-artificial intelligence service request does not require artificial intelligence to fulfill;
   transmitting the unfulfilled artificial intelligence service request to an artificial intelligence service module to fulfill the unfulfilled artificial intelligence service request which generates a fulfilled artificial intelligence service request, wherein the fulfilled artificial intelligence service request is a text command that can be processed by the user interaction application to generate an audio or visual response;
   concurrent with transmitting the unfulfilled artificial intelligence service request to an artificial intelligence service module, transmitting the unfulfilled non-artificial intelligence service request to a back-end server to fulfill the unfulfilled non-artificial intelligence service request, which generates a fulfilled non-artificial intelligence service request;
   combining, with an artificial intelligence proxy, the fulfilled artificial intelligence service request and the fulfilled non-artificial intelligence service request into a first fulfilled service request;
   transmitting from the artificial intelligence proxy the first fulfilled service request to the user interaction application;
   presenting the first fulfilled service request to the user as the audio or visual response on the user device on which the user interaction application is executing;

determining if the first fulfilled service request is compatible with and able to operate in the first type of operating system and the user interaction application;

if the first fulfilled service request is compatible with and able to operate in the first type of operating system and the user interaction application, transmitting the first fulfilled service request to the user interaction application; and if the first fulfilled service request is not compatible with or able to operate in the first type of operating system and the user interaction application, converting the first fulfilled service request into an alternative fulfilled service request that is compatible with and able to operate in the first type of operating system and the user interaction application and transmitting the alternative fulfilled service request to the user interaction application.

2. The method of claim 1 wherein the back-end server comprises the artificial intelligence service module.

3. The method of claim 1 wherein the unfulfilled artificial intelligence service request is selected from a following service request type: image modelling, text modelling, forecasting, planning, making recommendations, performing searches, processing speech into service requests, processing audio into service requests, processing video into service requests, processing image into service requests, facial recognition, motion detection, motion tracking, generating audio, generating text, generating image, or generating video.

4. The method of claim 1 further comprising:
receiving a second unfulfilled service request from the user interaction application,
generating a third unfulfilled service request,
processing the second unfulfilled service request and the third unfulfilled service request using the artificial intelligence module, the back-end server, or both to generate a second fulfilled service request, the second fulfilled service request fulfilling the second unfulfilled service request and the third unfulfilled service request;
transmitting the second fulfilled service request to the user interaction application; and
presenting the second fulfilled service request to the user as an audio or visual response on the user device on which the user interaction application is executing.

5. The method of claim 1, wherein the transmitting the unfulfilled artificial intelligence service request to an artificial intelligence service module is performed by an intelligent SDK embedded by the user interaction application.

6. A system for providing artificial intelligence services to user interaction applications comprising:
a user device comprising a memory storing non-transitory machine executable code, a processor configured to execute the machine executable code, and a user interface configured to receive a first input from a user and provide output to the user, the machine executable code comprising a user interaction application, with an intelligent SDK, configured to:
generate a first unfulfilled service request from the first input;
generating a first application state for a first session associated with the first unfulfilled service request;
generate, from the first unfulfilled service request, an unfulfilled artificial intelligence service request and an unfulfilled non-artificial intelligence service request, wherein the unfulfilled artificial intelligence service request is for language understanding to process speech of the user into a text command that can be processed by the user interaction application;
transmit the unfulfilled artificial intelligence service request to an artificial intelligence service module to fulfill the unfulfilled artificial intelligence service request, which generates a fulfilled artificial intelligence service request;
transmit the unfulfilled non-artificial intelligence service request to a back-end server to fulfill the unfulfilled non-artificial intelligence service request, which generates a fulfilled non-artificial intelligence service request while at the same time the artificial intelligence service module generates the fulfilled artificial intelligence service request;
combine the fulfilled artificial intelligence service request and the fulfilled non-artificial intelligence service request into a first fulfilled service request responsive to the first unfulfilled service request;
determine if the first fulfilled service request is compatible with and able to operate in the first type of operating system and the user interaction application;
if the first fulfilled service request is compatible with and able to operate in the first type of operating system and the user interaction application, transmit the first fulfilled service request to the user interaction application; and
if the first fulfilled service request is not compatible with or able to operate in the first type of operating system and the user interaction application, convert the first fulfilled service request into an alternative fulfilled service request that is compatible with and able to operate in the first type of operating system and the user interaction application and transmitting the alternative fulfilled service request to the user interaction application;
transmit the first fulfilled service request or the alternative fulfilled service request to the user interaction application to generate a first response which is output to the user via the user interface of the user device;
receiving a second input from the user;
generate a second unfulfilled service request from the second input;
based on the first application state from the first session, determining if the second unfulfilled service request from the second input augments the first fulfilled service request or if the second unfulfilled service request is unrelated to the first fulfilled service request and thus a second session should be initiated.

7. The system of claim 6 wherein the intelligent SDK is separate from the user interaction application.

8. The system of claim 6 wherein the intelligent SDK further comprises an artificial intelligence proxy, the artificial intelligence proxy configured to facilitate the transmission of the unfulfilled artificial intelligence service request, the fulfilled artificial intelligence service request, the unfulfilled non-artificial intelligence service request, and the fulfilled non-artificial intelligence service request to one or more back-end servers and one or more artificial intelligence service modules.

9. The system of claim 6 wherein the unfulfilled artificial intelligence service request is selected from a following service request type: image modelling, text modelling, forecasting, planning, making recommendations, performing searches, processing speech into service requests, processing audio into service requests, processing video into service requests, processing image into service requests, facial recognition, motion detection, motion tracking, generating audio, generating text, generating image, or generating video.

10. The system of claim 6 wherein:
the user interface is configured to receive a second input from the user and output a second response to the user;
the machine executable code, responsive to the second input from the user, is further configured to:
generate a second unfulfilled service request based on the second input;
generate a third unfulfilled service request based on the second input;
process the second unfulfilled service request and the third unfulfilled service request using an artificial intelligence module, a back-end server, or both, to generate a second fulfilled service request, the second fulfilled service request fulfilling the second unfulfilled service request and the third unfulfilled service request;
transmit the second fulfilled service request to the user interaction application to generate the second response;
provide the second response to the user.

11. A system for providing artificial intelligence services to user interaction applications comprising:
a user interaction application, operating on a first type operating system, the user interaction application configured as machine executable code stored in non-transitory form on a memory, that includes a user interface and an intelligent SDK, the user interface configured to receive input from a user and provide an output to the user, and the intelligent SDK configured to:
generate, from the first input, a first unfulfilled non-artificial intelligence service request and a first unfulfilled artificial intelligence service request, wherein the unfulfilled artificial intelligence service request is for language understanding to process speech of the user into a text command that can be processed by the user interaction application;
transmit the first unfulfilled non-artificial intelligence service request to a back-end server to fulfill the first unfulfilled non-artificial intelligence service request and to generate a first fulfilled non-artificial intelligence service request;
concurrent with transmitting the first unfulfilled non-artificial intelligence service request, transmit the first unfulfilled artificial intelligence service request to a selected artificial intelligence service module selected from two or more artificial intelligence service modules to fulfill the first unfulfilled artificial intelligence service request and to generate a first fulfilled artificial intelligence service request, wherein the selected artificial intelligence service module is selected based on compute capability of the two or more artificial intelligence service modules, and wherein concurrent with transmitting the first unfulfilled non-artificial intelligence service request, transmitting the first unfulfilled artificial intelligence service request establishes concurrent bidirectional streaming;
generate, from the first fulfilled non-artificial intelligence service request, and the first fulfilled artificial intelligence service request, the output for the user, the output responsive to the input;
determine if the output is compatible with the first type of operating system and the user interaction application;
if the output is compatible with the first type of operating system and the user interaction application, transmit the output to the user interaction application for presentation to the user; and
if the output is not compatible with the first type of operating system and the user interaction application, convert the output into an alternative output that is compatible with the first type of operating system and the user interaction application and transmitting the alternative output to the user interaction application for presentation to the user.

12. The system of claim 11 further comprising an artificial intelligence proxy, the artificial intelligence proxy configured to facilitate the transmission of the unfulfilled artificial intelligence service request, the fulfilled artificial intelligence service request, the unfulfilled non-artificial intelligence service request, and the fulfilled non-artificial intelligence service request to one or more back-end servers and one or more artificial intelligence service modules.

13. The system of claim 11 wherein the unfulfilled artificial intelligence service request is selected from a following service request type: image modelling, text modelling, forecasting, planning, making recommendations, performing searches, processing speech into service requests, processing audio into service requests, processing video into service requests, processing image into service requests, facial recognition, motion detection, motion tracking, generating audio, generating text, generating image, or generating video.

14. The system of claim 11 wherein:
the user interface is configured to receive a second input from the user and to provide a second output to the user;
the intelligent SDK, responsive to the second input from the user, is further configured to:
generate a second unfulfilled artificial intelligence service request based on the first input and the second input;
process the second unfulfilled artificial intelligence service request using an artificial intelligence module to generate a second fulfilled artificial intelligence service request, the second fulfilled artificial intelligence service request fulfilling the first unfulfilled artificial intelligence service request and the second unfulfilled artificial intelligence service request;
generate the second output from the second fulfilled artificial intelligence service request, the second output responsive to the first input and the second input.

15. The system of claim 11 wherein the user interface is configured to receive a third input from the user and to provide a third output to the user, the intelligent SDK, responsive to the third input from the user, is further configured to determine whether to generate a third unfulfilled artificial intelligence service request based on one of the following: (1) the first input, the second input, and the third input, (2) the second input, and the third input, or (3) the third input.

16. The system of claim 11 wherein the back-end server comprises the artificial intelligence module.

* * * * *